US012527446B2

(12) United States Patent
Aoyama et al.

(10) Patent No.: US 12,527,446 B2
(45) Date of Patent: Jan. 20, 2026

(54) WIPER BLADE

(71) Applicant: CANON KABUSHIKI KAISHA, Tokyo (JP)

(72) Inventors: Takehiko Aoyama, Shizuoka (JP); Hidekazu Matsuda, Shizuoka (JP); Syoji Inoue, Shizuoka (JP); Arihiro Yamamoto, Shizuoka (JP); Masanori Yokoyama, Shizuoka (JP); Shota Segawa, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 18/158,628

(22) Filed: Jan. 24, 2023

(65) Prior Publication Data

US 2023/0157493 A1 May 25, 2023

Related U.S. Application Data

(63) Continuation of application No. PCT/JP2021/028357, filed on Jul. 30, 2021.

(30) Foreign Application Priority Data

Jul. 31, 2020 (JP) ................................ 2020-130823
Apr. 30, 2021 (JP) ................................ 2021-077324
Jun. 28, 2021 (JP) ................................ 2021-106520

(51) Int. Cl.
*A47L 1/15* (2006.01)
*B08B 1/16* (2024.01)
*C08L 75/04* (2006.01)

(52) U.S. Cl.
CPC ................ *A47L 1/15* (2013.01); *B08B 1/165* (2024.01); *C08L 75/04* (2013.01)

(58) Field of Classification Search
CPC .. B60S 3/045; A47L 13/11; A47L 1/15; A47L 1/06; A47L 15/245; B08B 1/165;
(Continued)

(56) References Cited

U.S. PATENT DOCUMENTS 3,892,005 A * 7/1975 Berns ...................... A47L 13/11 24/538
4,719,247 A * 1/1988 Lin .................... C08G 18/6607 252/182.28

(Continued)

FOREIGN PATENT DOCUMENTS

CN 104133360 A 11/2014
CN 105573087 A 5/2016

(Continued)

OTHER PUBLICATIONS

International Search Report in International Application No. PCT/JP2021/028357 (Oct. 2021).

(Continued)

*Primary Examiner* — Katina N. Henson
*Assistant Examiner* — Sharonda T Felton
(74) *Attorney, Agent, or Firm* — Venable LLP

(57) ABSTRACT

A wiper blade comprising: a hand grip portion; and an elastic portion supported by the hand grip portion and that is pressed against a surface to be cleaned; the elastic portion having, on a tip side, a main surface opposing a member to be cleaned, and a tip surface that forms a tip side edge together with the main surface, and in a specific observation region of the tip surface and the main surface, the average value of elastic modulus values obtained through measurement at a 0.1 μm pitch being 15 MPa to 470 MPa, and the coefficient of variation of the elastic modulus being 17.6% or less.

6 Claims, 11 Drawing Sheets

(58) Field of Classification Search
CPC .... B08B 1/34; B08B 1/36; B08B 1/16; C08L 75/04
USPC ......... 15/245, 245.1, 250.1, 250.361, 250.48
See application file for complete search history.

(56) References Cited

U.S. PATENT DOCUMENTS

| | | | | |
|---|---|---|---|---|
| 6,696,391 | B2 * | 2/2004 | Goto | C08J 7/0427 508/113 |
| 8,568,888 | B2 * | 10/2013 | Choate | B05D 7/53 528/48 |
| 9,170,556 | B2 | 10/2015 | Karashima et al. | |
| 9,547,272 | B2 | 1/2017 | Ito et al. | |
| 9,632,474 | B2 | 4/2017 | Yamamoto et al. | |
| 9,996,047 | B2 | 6/2018 | Kawakami et al. | |
| 10,088,795 | B2 | 10/2018 | Ikeda et al. | |
| 10,343,190 | B2 * | 7/2019 | Osajima | B08B 1/165 |
| 11,945,414 | B2 * | 4/2024 | Aoyama | C08L 75/04 |
| 2002/0163105 | A1 | 11/2002 | Kosaka et al. | |
| 2008/0188577 | A1 * | 8/2008 | Schmidt | C08G 18/4236 521/63 |
| 2019/0150602 | A1 * | 5/2019 | Hamilton | A46B 15/0081 |
| 2022/0291622 | A1 | 9/2022 | Yamamoto et al. | |

FOREIGN PATENT DOCUMENTS

| | | | |
|---|---|---|---|
| CN | 116057099 | A | 5/2023 |
| JP | 2004-243917 | A | 9/2004 |
| JP | 2007253855 | A | 10/2007 |
| JP | 2010-134310 | A | 6/2010 |
| JP | 2019-115471 | A | 7/2019 |
| WO | 2016/208600 | A1 | 12/2016 |
| WO | 2022/025246 | A1 | 2/2022 |
| WO | 2022/025262 | A1 | 2/2022 |
| WO | 2022/025267 | A1 | 2/2022 |
| WO | 2022/025273 | A1 | 2/2022 |

OTHER PUBLICATIONS

Extended European Search Report in European Application No. 21850855.4 (Aug. 2024).
First Office Action in Chinese Application No. 202180057440.9 (Apr. 2025).
Segawa et al., U.S. Appl. No. 18/158,633, filed Jan. 24, 2023.
Aoyama et al., U.S. Appl. No. 18/158,617, filed Jan. 24, 2023.
Segawa et al., U.S. Appl. No. 18/158,608, filed Jan. 24, 2023.

* cited by examiner

WIPER BLADE

CROSS-REFERENCE TO RELATED APPLICATION

This is a continuation of International Application No. PCT/JP2021/028357, filed on Jul. 30, 2021, and designated the U.S., and claims priority from Japanese Patent Application No. 2020-130823 filed on Jul. 31, 2020, Japanese Patent Application No. 2021-077324 filed on Apr. 30, 2021, and Japanese Patent Application No. 2021-106520 filed on Jun. 28, 2021, the entire contents of which are incorporated herein by reference.

BACKGROUND OF THE INVENTION

Technical Field of the Invention

The present disclosure relates to a wiper blade the surface of a to-be-cleaned member.

Description of the Related Art

As a cleaning tool of the to-be-cleaned surface such as a glass surface, there is a cleaning tool having a cleaning part and a grip part which can be gripped by a cleaning worker (Japanese Patent Application Publication No. 2019-115471).

SUMMARY OF THE INVENTION

At least one aspect of the present disclosure is directed to providing a wiper blade capable of exhibiting excellent wiping ability, which is, for example less likely to cause wiping unevenness even when pressing against the to-be-cleaned surface is not strengthened.

According to at least one aspect of the present disclosure, there is provided a wiper blade, comprising:

a hand grip portion; and an elastic portion supported by the hand grip portion and that is pressed against a surface to be cleaned;

a part of the elastic portion being brought into contact with a surface of a member to be cleaned, to thereby clean the surface of the member to be cleaned, when defining a side of the elastic portion farthest away from the hand grip portion as a tip side of the wiper blade, the elastic portion having, on the tip side, a main surface opposing a member to be cleaned, and a tip surface that forms a tip side edge together with the main surface;

assuming that a first line segment is drawn on the tip surface parallelly to the tip side edge at a distance of 10 μm from the tip side edge, a length of the first line segment is defined as L1;

points at (⅛)L1, (½)L1 and (⅞)L1 from one end side on the first line segment are defined as P0, P1 and P2 respectively; and when measuring, using a scanning probe microscope, the elastic modulus at 70000 points at a 0.1 μm pitch in each of three rectangular observation regions on the tip surface, each of the rectangular observation regions having respective barycenters at P0, P1 and P2, and having a 70 μm-long side parallel to the first line segment and a 10 μm-long side perpendicularly intersecting the first line segment, a mean value of the 210000 obtained elastic modulus values being 15 MPa to 470 MPa, and a coefficient of variation of the elastic modulus being 17.6% or lower; and assuming that a second line segment is drawn on the main surface parallelly to the tip side edge at a distance of 10 μm from the tip side edge, a length of the second line segment is defined as L2;

points at (⅛)L2, (½)L2 and (⅞)L2 from one end side on the second line segment, are defined as P3, P4 and P5 respectively; and when measuring, using a scanning probe microscope at 70000 points at a 0.1 μm pitch in each of three rectangular observation regions on the main surface, each of the rectangular observation regions having barycenters at P3, P4 and P5, and having a 70 μm-long side parallel to the second line segment and a 10 μm-long side perpendicularly intersecting the second line segment, a mean value of the 210000 obtained elastic modulus values being 15 MPa to 470 MPa, and a coefficient of variation of the elastic modulus being 17.6% or lower.

Further features of the present invention will become apparent from the following description of exemplary embodiments with reference to the attached drawings.

DESCRIPTION OF THE EMBODIMENTS

In the present disclosure, the description "from XX to YY" or "XX to YY" indicative of the numerical value range means the numerical value range including the lower limit and the upper limit of the endpoints unless otherwise specified. When the numerical value range is described in stages, the upper limit and the lower limit of each numerical value range can be combined arbitrarily.

As for a conventional wiper blade, when pressing against the to-be-cleaned surface is weak, wiping unevenness tends to occur. Whereas, when the to-be-cleaned surface is pressed with a strong force, the contact part with the to-be-cleaned member tends to be disturbed. In an extraordinary case, a so-called vibration is caused, which may result in the occurrence of the wiping unevenness.

Particularly, for window glass in buildings and showrooms, such as those facing a street, stain with a strong attachment force such as fine particles included in the exhaust gas of a car, dust or an oil film of asphalt, or the like is deposited on the glass surface, which cannot be wiped out with ease. As a result, wiping unevenness may become extraordinary.

The inventors found that for the purpose of bringing out excellent wiping ability in a wiper blade, also with a weak pressing force, it is effective to control the elastic modulus, and coefficient of variation thereof of a specific portion of an elastic portion of the wiper blade that comes in contact with a member to be cleaned, so as to lie within specific ranges.

<Configuration of Wiper Blade>

A wiper blade in accordance with one aspect of the present disclosure includes a grip part 1 gripped by a hand, and an elastic part 2 supported by the grip part, and pressed against the to-be-cleaned surface as shown in FIG. 1A to 1D. The wiper blade comes in contact at a part of the elastic part thereof with the surface of the to-be-cleaned member, and cleans the surface of the to-be-cleaned member.

Figure 1A:
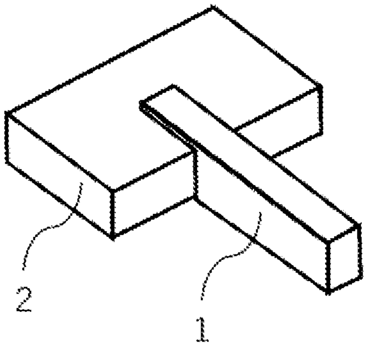
FIG. 1A, FIG. 1B, FIG. 1C and FIG. 1D are examples of schematic diagrams of a wiper blade.
Figure 1B:
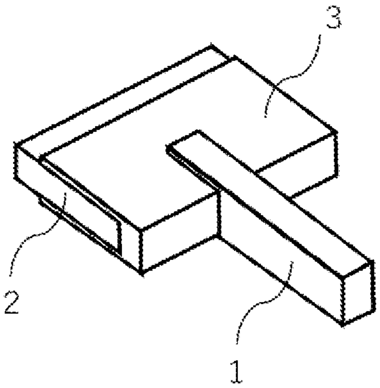

FIG. 1A to 1D show example schematic views of the wiper blade. FIG. 1A shows that the grip part 1 and the elastic part 2 are included. However, as shown in FIG. 1B, a support part 3 for supporting the elastic part 2 may be included between the grip part 1 and the elastic part 2.

Figure 1C:
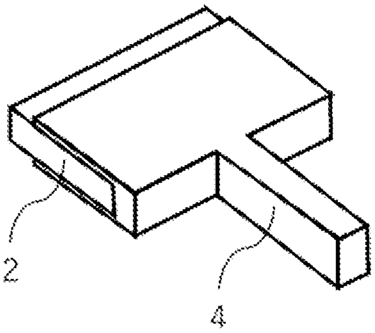

Alternatively, for example, as shown in FIG. 1C, a support grip part 4 integrally including the support part and the grip part may be included.

Figure 1D:
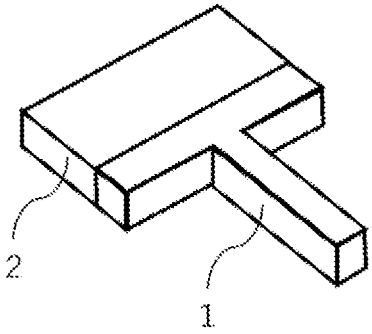

As shown in FIG. 1D, the elastic part and the grip part may be integral with each other.

The grip part 1, the support part 3, and the elastic part 2 may be detachable or integrated with one another.

Figure 2A:
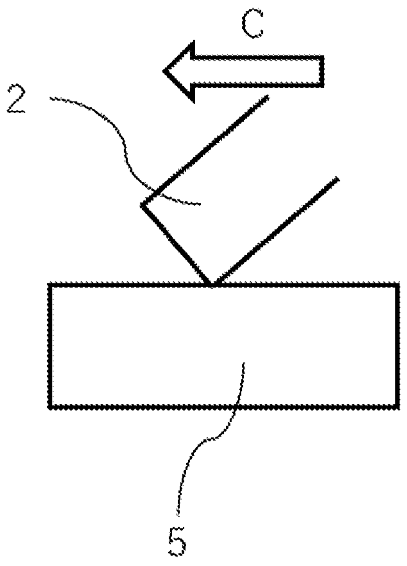
FIG. 2A and FIG. 2B are explanatory diagrams illustrating states in a cleaning process of a wiper blade.
Figure 2B:
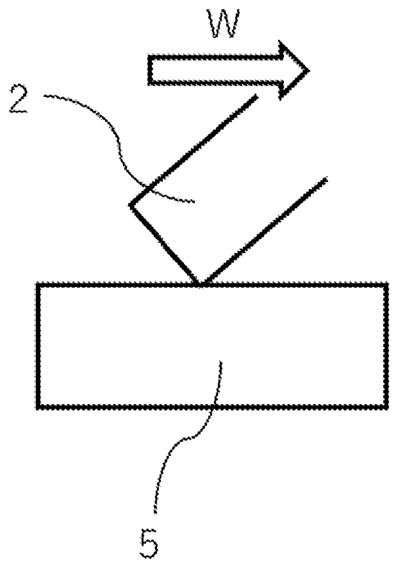

FIGS. 2A and 2B are explanatory views showing the state of the process in which the elastic part 2 of the wiper blade comes in contact with the to-be-cleaned member 5, and is slid for cleaning. As shown in FIGS. 2A and 2B, the wiper blade can be used in the pushing direction C so as to move from the grip part 1 toward the elastic part 2 as well as in the pulling direction W.

Figure 3:
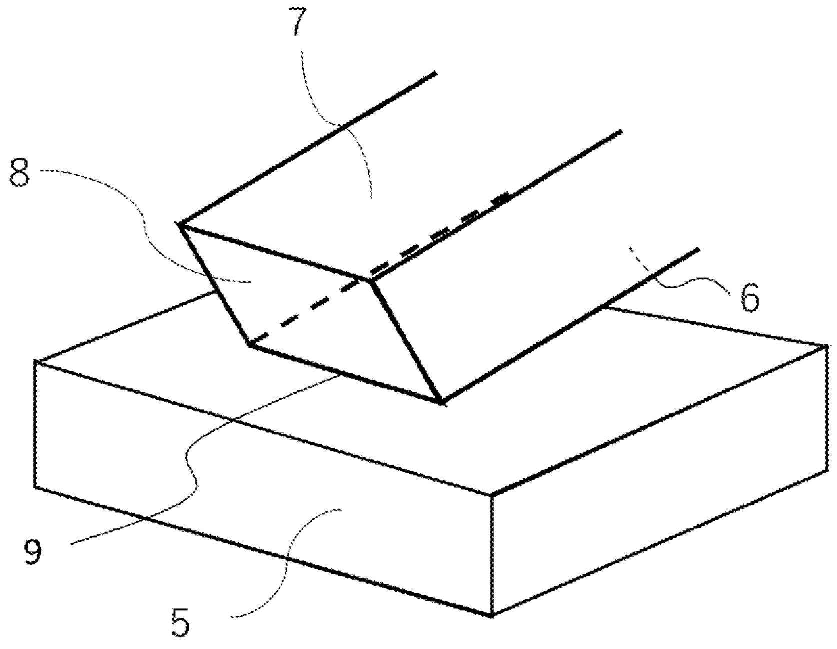
FIG. 3 is an enlarged schematic diagram of a contact portion of an elastic portion of a wiper blade and a member to be cleaned.

FIG. 3 is an enlarged schematic diagram of a contact portion between the elastic portion 2 and the member to be cleaned 5. Defining herein a tip side of the wiper blade as the side of the elastic portion lying farthest from the hand grip portion, as illustrated in FIG. 3, the elastic portion 2 has a main surface 6 opposing the member to be cleaned 5, at the tip side, and a tip surface 8 that forms a tip side edge 9 together with the main surface 6. The tip side edge 9 extending along the longitudinal direction of the elastic portion 2 is formed, on the elastic portion 2, by the main surface 6 and the tip surface 8.

Figure 4:
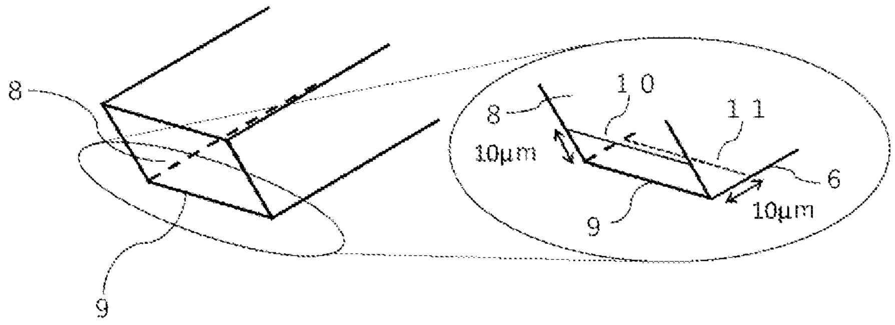
FIG. 4 is an enlarged-view diagram of the vicinity of a tip side edge.
Figure 5:
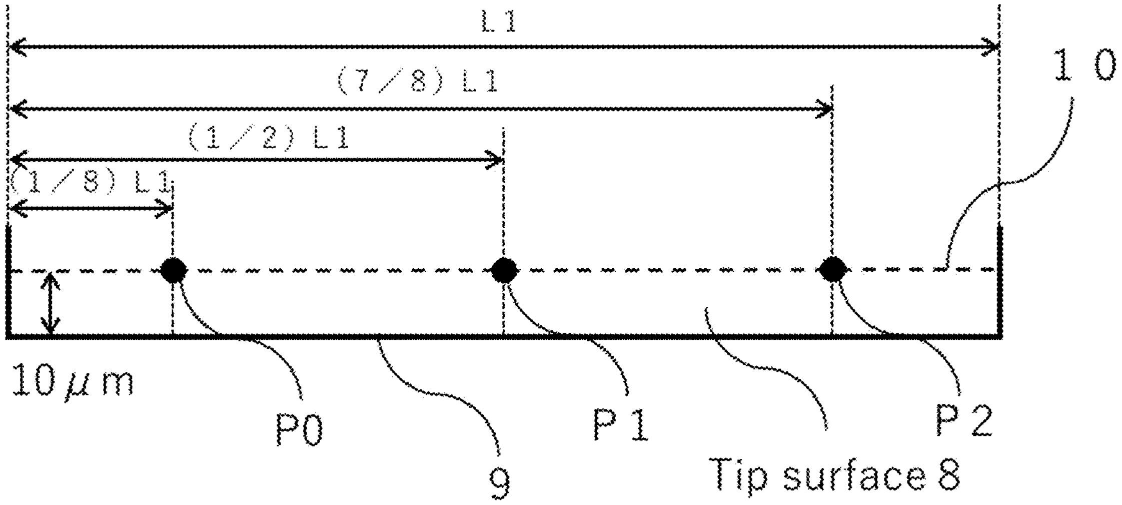
FIG. 5 is an enlarged-view diagram of the vicinity of a first line segment.

FIG. 4 is an enlarged-view diagram of the vicinity of the tip side edge 9. As illustrated in FIG. 4, it is assumed that a first line segment 10 is drawn on the tip surface 8 parallelly to the tip side edge 9 at a distance of 10 μm from the tip side edge 9. Herein L1 denotes the length of the first line segment 10. FIG. 5 is an enlarged-view diagram of the vicinity of the first line segment. As illustrated in FIG. 5, P0, P1 and P2 denote points at (⅛)L1, (½)L1 and (⅞)L1 from one end side on the first line segment 10, respectively. Herein there are set, on the tip surface 8, three rectangular observation regions having a 70 μm-long side parallel to the first line segment 10 and a 10 μm-long side perpendicularly intersecting the first line segment, and having respective barycenters at P0, P1 and P2 on the first line segment.

Figure 6:
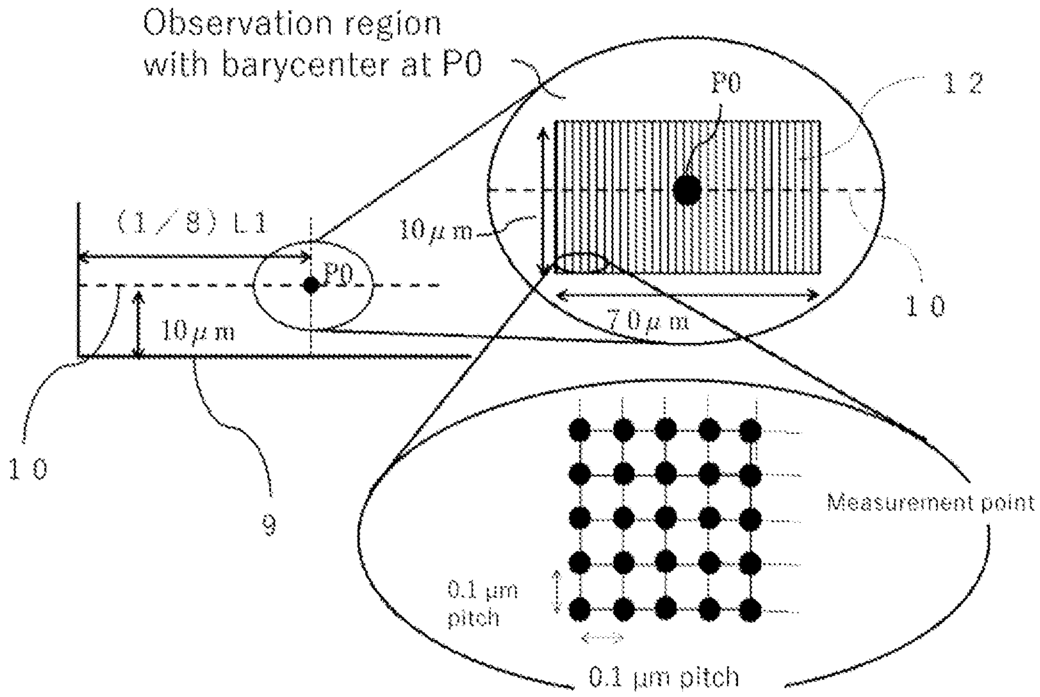
FIG. 6 is an enlarged-view diagram of the vicinity of an observation region 12 having a barycenter at P0.

FIG. 6 illustrates an enlarged-view diagram of the vicinity of the observation region 12 having P0 as the barycenter thereof. The elastic modulus of the tip surface at 70000 points at a pitch (spacing) of 0.1 μm for each of the three observation regions, including both P1 and P2, was measured, similarly to P0 in FIG. 6, using a scanning probe microscope (hereafter referred to as SPM). The mean value of a total of 210000 elastic modulus values that were obtained is from 15 MPa to 470 MPa, and the coefficient of variation of the elastic modulus is 17.6% or lower.

Similarly to the measurement at the tip surface, it is assumed that a second line segment 11 is be drawn on the main surface 6 as illustrated in FIG. 4 parallelly to the tip side edge 9 at a distance of 10 μm from the tip side edge 9. Herein L2 denotes the length of the second line segment 11. Further, P3, P4 and P5 respectively denote points at (⅛)L2, (½)L2, and (⅞)L2 from one end side of the second line segment 11.

Herein there are set, on the main surface 6, three rectangular observation regions, having a 70 μm-long side parallel to the second line segment 11 and a 10 μm-long side perpendicularly intersecting the second line segment, and having respective barycenters at P3, P4 and P5 on the second line segment. The elastic modulus of the main surface was measured at 70000 points at a pitch (spacing) of 0.1 μm for each of the three observation regions, using an SPM. The mean value of a total of 210000 elastic modulus values that were obtained is from 15 MPa to 470 MPa, and the coefficient of variation of the elastic modulus is 17.6% or lower.

The behavior of the wiper blade during cleaning was observed in detail. As a result it was found that when the wiper blade was moved in direction C of pushing from the hand grip portion towards the elastic portion, the wiper blade came in contact with the member to be cleaned at a region that included a position on the tip surface 8 at about 10 μm from the tip side edge 9. In a case where the wiper blade was moved in a direction W of pulling, it was found that the wiper blade came in contact at a region, on the main surface 6, that included a position about 10 μm from the tip side edge 9.

The wiper blade according to one aspect of the present disclosure allows preventing the occurrence of wiping streaks and uneven wiping at a wiped portion of the member to be cleaned by virtue of the fact that the mean value of elastic modulus in the longitudinal direction of each region that can constitute the above contact portion with the member to be cleaned, and the coefficient of variation of that elastic modulus, satisfy predetermined stipulations.

In the wiper blade according to one aspect of the present disclosure, a mean of elastic modulus values measured at 10-μm positions from the tip side edge on the tip surface and main surface and at positions in the longitudinal direction at regions in the vicinity of the 10-μm positions and that can constitute a contact portion of contact with the member to be cleaned, is from 15 MPa to 470 MPa, and the coefficient of variation of the elastic modulus is 17.6% or lower. The mean of elastic modulus values is preferably from 32 MPa to 62 MPa. The coefficient of variation of the elastic modulus is preferably 6.0% or lower. The coefficient of variation of the elastic modulus is preferably as small as possible, and thus the lower limit is not particularly restricted, but is for instance 0.10% or higher.

In a case where the mean of elastic modulus values lies within the above ranges, a part of the elastic portion of the wiper blade can be brought into contact with the member to be cleaned within a narrow width, over the longitudinal direction of the wiper blade, at the time of cleaning. That is, the contact portion can be caused to approximate line contact, with pressing forces concentrating on the contact portion, and such that deposits can be reliably scraped off, and not simply wiped off or spread out, from the member to be cleaned. As a result very high wiping performance can be brought out as compared with conventional wiper blades.

A feature wherein the coefficient of variation of the elastic modulus is 17.6% or lower signifies herein that the elastic modulus of the elastic portion at the contact portion is more uniform or more homogeneous in the longitudinal direction of the elastic portion. As a result, the pressing force from the wiper blade to the member to be cleaned can be applied uniformly over the longitudinal direction of the wiper blade. As a result this allows bringing out stable hugging ability and contactability with the portion to be cleaned of the member to be cleaned, while suppressing the occurrence of vibration and the like, and without waviness of the surface to be cleaned in the longitudinal direction of the wiper blade at the time of cleaning. In consequence, the wiper blade according to one aspect of the present disclosure can stably bring out excellent wiping ability, without wiping streaks or uneven wiping, also for highly adhesive dirt such as oil films, adhered to the member to be cleaned.

The coefficient of variation of the elastic modulus is calculated in accordance with Formula (1) below.

Coefficient of variation (%)=(standard deviation/mean of elastic modulus values)×100 Formula (1)

For instance when a wiper blade is pressed against a member to be cleaned under a load of 16.7 N/m, a contact angle is about 25° in the vicinity of the contact portion, nip width is from 20 to 30 μm, and contact pressure is 1.5 MPa at a maximum, in the case of conventional wiper blades. By contrast, the wiper blade of the present disclosure yields measured values that include a contact angle of about 55°, a nip width from 5 to 6 μm, and a contact pressure of 6.0 MPa.

Figure 7:
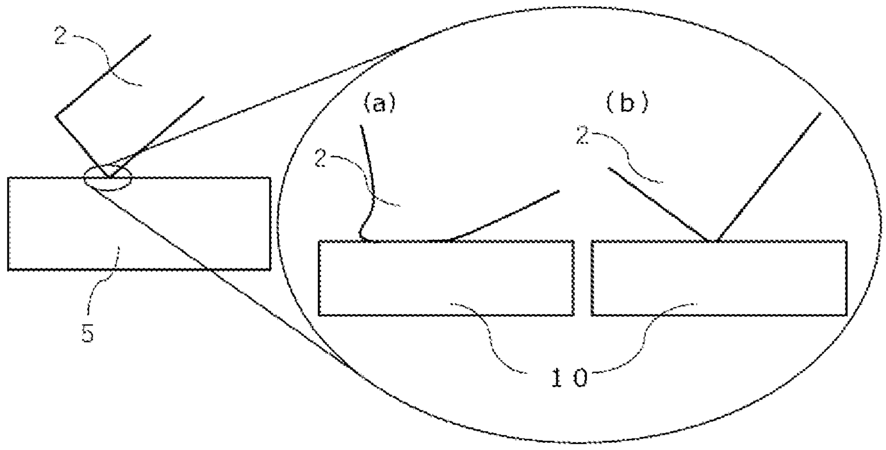
FIG. 7 is a schematic diagram of the vicinity of a contact portion of a wiper blade with a member to be cleaned.

FIG. 7 illustrates a schematic diagram of the vicinity of the contact portion of the wiper blade with the member to be cleaned. As illustrated in (a) of FIG. 7, conventional wiper blades ostensibly have comparatively wide surfaces of contact against the member to be cleaned. The wiper blade according to one aspect of the present disclosure comes in contact with the member to be cleaned in a state that approximates line contact, as illustrated in (b) of FIG. 7.

The material that makes up the elastic portion 2 is not particularly limited, so long as it is a material that can form a contact portion of contact with the member to be cleaned, and such that the mean of elastic modulus values and the coefficient of variation of the elastic modulus at 10-μm positions, and vicinity thereof, from the tip side edge of the tip surface and the main surface, conform to the above stipulations. Specifically, for instance the elastic portion preferably contains a polyurethane that exhibits excellent mechanical characteristics, and the characteristics of the polyurethane are adjusted comparatively easily.

Also, the above polyurethane is preferably a polyurethane elastomer. A polyurethane elastomer is obtained mainly from raw materials such as polyols, chain extenders, polyisocyanates, catalysts and other additives. The above polyurethane elastomer is a block copolymer made up of hard segments and soft segments. The hard segments are ordinarily made up of chain extenders such as polyisocyanates and short-chain diols. Soft segments are ordinarily made up of polyisocyanates and long-chain polyols such as polyester polyols, polyether polyols or polycarbonate polyols.

For instance the characteristics of the block copolymer made up of the above hard segments and soft segments may be exploited in order to achieve the above mean value of elastic modulus according to the present disclosure and in order to regulate of the coefficient of variation of the elastic modulus according to the present disclosure.

In conventional polyurethanes, aggregated portions of urethane bond portions, resulting from aggregation derived from urethane bond interactions, have comparatively large hard segments that arise in turn from further aggregation. Studies by the inventors have revealed that, as a result, a wiper blade produced using a conventional polyurethane does not satisfy at least one from among the mean of elastic modulus values and the coefficient of variation of elastic modulus according to the present disclosure. That is, conventional polyurethanes have relatively large hard segments, and hence it is difficult to bring the coefficient of variation of the elastic modulus at 210000 sites to be lower than 17.6%, in scanning probe microscopy, as in the present disclosure. It is deemed that further aggregation of the aggregated portions of urethanes bond can be suppressed, and the coefficient of variation can be kept small, in the case of a polyurethane having a small amount of hard segments themselves. In that case, however, it is difficult to set the mean of elastic modulus values to be 15 MPa or larger.

The elastic portion according to one aspect of the present disclosure may be formed for instance by a polyurethane in which hard segments are finely and uniformly dispersed.

Multiple examples of polyurethanes into which hard segments are dispersed finely and uniformly will be explained further on. The constituent materials of the elastic portion according to the present disclosure, however, are not limited to such polyurethanes.

A polyurethane can be obtained that results from fine and uniform dispersion of hard segments, with suppressed hard segment aggregation, through the use of urethane raw materials in the form of a diisocyanate or trifunctional or higher polyfunctional isocyanate and a diol or trifunctional or higher polyfunctional alcohol, within appropriate concentration ranges.

Specifically, preferably there is used for instance at least one from among an alcohol including a trifunctional or higher polyfunctional alcohol and an isocyanate compound including a trifunctional or higher polyfunctional isocyanate, as urethane raw materials.

Also preferable is to use an alcohol including at least one selected from among diols and trifunctional or higher polyfunctional alcohols, and an isocyanate compound including a trifunctional or higher polyfunctional isocyanate, as urethane raw materials.

Likewise preferable is to use an alcohol including a trifunctional or higher polyfunctional alcohol, and an isocyanate compound including a diisocyanate and a trifunctional or higher polyfunctional isocyanate, as urethane raw materials.

Particularly preferably, a trifunctional or higher polyfunctional isocyanate and a trifunctional or higher polyfunctional alcohol are used as urethane raw materials.

A polyurethane obtained as a reaction product of a trifunctional or higher polyfunctional isocyanate and a trifunctional or higher polyfunctional alcohol exhibits suppressed molecular orientation, on account of steric hindrance, such that hard segment aggregation is yet more reliably suppressed. As a result, the polyurethane is a suitable polyurethane in terms of achieving the elastic modulus and coefficient of variation according to the present disclosure.

Also, crystallinity is enhanced, through stacking of soft segments, in a case where soft segment moieties have for instance a linear alkylene structure. Hard segments do not readily disperse as a result. Accordingly, also introduction of an alkylene structure having a side chain portion into the soft segment moieties is herein effective in suppressing hard segment aggregation. Specifically, for instance introduction of substructures such as those represented by the following Structural formulae (i) to (iv) into soft segment moieties between two urethane bonds is effective in terms of making hard segments smaller.

$$—CH_2—CH(CH_3)—CH_2—CH_2—O— \quad (i)$$

$$—CH_2—CH_2—CH(CH_3)—CH_2—O— \quad (ii)$$

$$—CH_2—CH(CH_3)—O— \quad (iii)$$

$$—CH(CH_3)—CH_2—O— \quad (iv)$$

The structures in Structural formulae (i) and (ii), which are substantially identical, result from ring-opening polymerization of 3-methyltetrahydrofuran. The structures in Structural formulae (iii) and (iv), which are substantially identical, result from ring-opening polymerization of 1,2-propylene oxide. A urethane resin having these structures between two adjacent urethane bonds can be obtained herein by causing a polyether polyol or polyester polyol having these structures to react with an isocyanate. It is ordinarily difficult to achieve fine dispersion of hard segments in a case where a bifunctional alcohol (diol) and a bifunctional isocyanate (diisocyanate) are used as urethane raw materials. However, hard segments can be finely dispersed, even when using a diol and a diisocyanate, by introducing the above substructures into the soft segment moieties. A polyurethane can be obtained as a result that yields a wiper blade satisfying the parameters according to the present disclosure.

Methods for suppressing crystallization derived from soft segment stacking and preventing hard segment aggregation, other than by introducing side chains into soft segment moieties, as described above, include for instance methods that involve utilizing two or more types of alcohol having straight-chain portions having dissimilar numbers of carbon atoms, as the alcohol among the urethane raw materials. In polyurethanes obtained by using two or more types of straight-chain portions with dissimilar numbers of carbon atoms, crystallization derived from stacking of soft segments can be suppressed by virtue of the fact that the numbers of carbon atoms are dissimilar, also when the soft segment moieties have a straight-chain alkylene structure. Given that the number of carbon atoms in the soft segment moieties are dissimilar, aggregation of urethane bond portions is suppressed thereby, which as a result allows preventing hard segment aggregation. Therefore, the hard segments can be made smaller also in a case where a diisocyanate and a diol having a straight-chain alkylene structure in the molecule are utilized as urethane raw materials, by using herein, as the above diol, a plurality of diols having different numbers of carbon atoms in the straight-chain alkylene structure. A polyurethane can be obtained as a result that yields a wiper blade satisfying the parameters according to the present disclosure. Examples of multiple types of diol include for instance a concomitant use of a polybutylene adipate polyester polyol and a polyhexylene adipate polyester polyol.

Examples of the above alcohol include the following.

Polyester polyols such as polyethylene adipate polyester polyol, polybutylene adipate polyester polyol, polyhexylene adipate polyester polyol, (polyethylene/polypropylene) adipate polyester polyol, (polyethylene/polybutylene) adipate polyester polyol and (polyethylene/polyneopentylene) adipate polyester polyol; polycaprolactone-based polyols obtained through ring-opening polymerization of caprolactone; polyether polyols such as polyethylene glycol, polypropylene glycol and polytetramethylene ether glycol; as well as polycarbonate diol. The foregoing may be used singly or in combinations of two or more types.

There are preferably used two or more types of polyol having straight-chain portions (alkylene chains) with dissimilar numbers of carbon atoms, as described above, since in that case a urethane is obtained in which soft segment crystallization is inhibited and hard segment aggregation is suppressed. In this case there are preferably used for instance at least two selected from the group consisting of polyester polyols such as polyethylene adipate polyester polyol, polybutylene adipate polyester polyol, polyhexylene adipate polyester polyol, (polyethylene/polypropylene) adipate polyester polyol, (polyethylene/polybutylene) adipate polyester polyol and (polyethylene/polyneopentylene) adipate polyester polyol.

A diol or trifunctional or higher polyfunctional alcohol capable of extending polyurethane elastomer chains may be used as the above chain extender.

Examples of diols include the following.

Ethylene glycol (EG), diethylene glycol (DEG), propylene glycol (PG), dipropylene glycol (DPG), 1,4-butanediol (1,4-BD), 1,6-hexanediol (1,6-HD), 1,4-cyclohexanediol, 1,4-cyclohexanedimethanol, xylylene glycol (terephthalyl alcohol) and triethylene glycol. The foregoing may be used singly or in combinations of two or more types.

Examples of the trifunctional or higher polyfunctional alcohol include trimethylolpropane (TMP), glycerin, pentaerythritol and sorbitol. The foregoing may be used singly or in combinations of two or more types.

One method for increasing the elastic modulus of polyurethane elastomers may involve for instance introducing a crosslinked structure. A preferred method for introducing a crosslinked structure involves for instance using a trifunctional or higher polyfunctional alcohol as the above chain extender. Introducing a branched structure into a polyurethane by using a trifunctional or higher polyfunctional alcohol allows herein suppressing polyurethane crystallization and further suppressing hard segment aggregation. Preferably, a trifunctional alcohol is used as the polyfunctional alcohol, from the viewpoint of suppressing excessive increases in hardness derived from an excessively high degree of crosslinking of the polyurethane. Preferred among the foregoing are triols, since these have a methylene skeleton adjacent to a hydroxyl group, can yield a flexible crosslinked structure in the molecular structure, and elicit the effect of further suppressing hard segment crystallinity. Examples of such triols include for instance trimethylolpropane (TMP) and glycerin.

Examples of the above isocyanate compound include the following.

4,4'-diphenylmethane diisocyanate (4,4'-MDI), polymeric MDI, 2,4-tolylene diisocyanate (2,4-TDI), 2,6-tolylene diisocyanate (2,6-TDI), xylene diisocyanate (XDI), 1,5-naphthylene isocyanate (1,5-NDI), p-phenylene diisocyanate (PPDI), hexamethylene diisocyanate (HDI), isophorone diisocyanate (IPDI), 4,4'-dicyclohexylmethane diisocyanate (hydrogenated MDI), tetramethylxylene diisocyanate (TMXDI), carbodiimide-modified MDI, triphenylmethane-4,4',4"-triisocyanate (TTI) and tris(phenylisocyanate)thiophosphate (TPTI).

Preferred among the foregoing is 4,4'-MDI, since the two isocyanate groups thereof have commensurate reactivity, and the compound affords high mechanical characteristics. Preferably, a trifunctional or higher polyfunctional isocyanate is used concomitantly. Using herein a trifunctional or higher polyfunctional isocyanate allows introducing a branched structure into the polyurethane, and is effective in terms of further suppressing hard segment aggregation. Moreover, a denser crosslinked structure can be introduced into the polyurethane, and hence contactability of an elastic portion against the member to be cleaned can be made more stable. It becomes possible as a result to effectively suppress wiping streaks and uneven wiping in the member to be cleaned.

Examples of the trifunctional or higher polyfunctional isocyanate include at least one selected from the group consisting of triphenylmethane-4,4',4"-triisocyanate (TTI), tris(phenylisocyanate)thiophosphate (TPTI) and polymeric MDI. Among the foregoing, tris(phenylisocyanate) thiophosphate (TPTI) and polymeric MDI can be used more suitably. These isocyanates have a methylene group or an ether group between multiple NCO groups, such that distances between multiple urethane bonds can be maintained properly. These isocyanates are accordingly advantageous in terms of suppressing hard segment aggregation.

Polymeric MDI is represented by the following Chemical formula (1) and Chemical formula (1)'. In Chemical formula (1)', n is preferably from 1 to 4. Chemical formula (1) is an instance where n is 1 in Chemical formula (1)'.

(1)

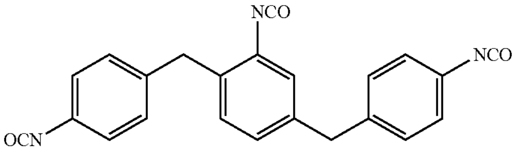

(1)'

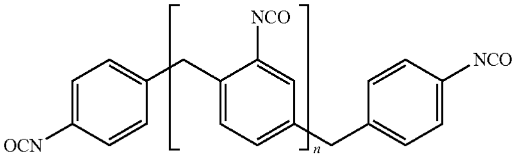

Preferably, the elastic portion according to the present disclosure has the physical properties below in a case where the elastic portion contains a polyurethane which is a cured product of a composition that contains an isocyanate compound including a diisocyanate and trifunctional or higher polyfunctional isocyanate, and an alcohol including a trifunctional or higher polyfunctional alcohol. Specifically, it is assumed that respective line segments are drawn on the tip surface and on the main surface of the elastic portion parallelly to the tip side edge at a distance of 0.5 mm from the tip side edge. With L' as the length of each line segment, P0', P1', P2' denote points at ⅛L', ½L', ⅞L' from one end side on the line segment, respectively.

Respective samples having been sampled at the above P0', P1' and P2' on the tip surface and on the main surface are heated up to 1000° C. at a ramp rate of 10° C./s, using a mass spectrometer of direct sample introduction type in which the sample is heated and vaporized within an ionization chamber, and sample molecules are ionized. Herein M1 denotes the detected amount of all ions obtained as a result, and M2 denotes a peak integrated intensity in an extracted ion thermogram corresponding to a range of an m/z value derived from the trifunctional or higher polyfunctional isocyanate. In this case M2/M1 at the tip surface and/or the main surface is ranges preferably from 0.0010 to 0.0150, and particularly preferably from 0.0030 to 0.0150.

With M3 as the peak integrated intensity in an extracted ion thermogram corresponding to a range of an m/z value derived from a diisocyanate, M3/M1 at the tip surface and/or main surface lies preferably in the range of 0.0200 to 0.1100, and more preferably from 0.0380 to 0.0760.

By virtue of the fact that M2/M1 and M3/M1 lie within the above ranges, an appropriate amount of a low-crystallinity structure derived from the trifunctional or higher polyfunctional isocyanate becomes introduced into the polyurethane; as a result, hard segment aggregation can be suppressed, and hard segments can be dispersed more finely and more uniformly. In addition, development of the crosslinked structure in the polyurethane can be prevented from becoming excessive, and the mean value of elastic modulus can be easily adjusted to lie in the range from 15 MPa to 470 MPa.

Preferably M2/M3 is set to lie in the range from 0.0130 to 0.3000. Herein M2/M3 is a parameter denoting a ratio of structural portions derived from a diisocyanate and structural portions derived from a trifunctional or higher polyfunctional isocyanate, in a structure derived from an isocyanate in the polyurethane. By setting M2/M3 to lie in the above ranges it becomes possible to suppress excessive increases in elastic modulus of the polyurethane, and to further suppress hard segment aggregation in the polyurethane.

In a case where the polyurethane according to one aspect of the present disclosure is a polyurethane produced using polymeric MDI represented by Chemical formula (1)', as a trifunctional or higher polyfunctional isocyanate, M2 may be set to the total of peak integrated intensities corresponding to a range where an m/z value derived from n=1 in the structure represented by Chemical formula (1)' is from 380.5 to 381.5, a range where an m/z value derived from n=2 is from 511.5 to 512.5, a range where an m/z value derived from n=3 is from 642.5 to 643.5, and a range where an m/z value derived from n=4 is from 773.5 to 774.5, in an extracted ion thermogram obtained through mass spectrometry described above.

In a case where the polyurethane according to one aspect of the present disclosure is a polyurethane produced using, as one of the raw materials, 4,4'-MDI represented by Chemical formula (2) below, as a bifunctional isocyanate (diisocyanate), M3 may be set to a peak integrated intensity corresponding to a range where an m/z value derived from a structure represented by Chemical formula (2) is from 249.5 to 250.5, in an extracted ion thermogram obtained through mass spectrometry described above.

(2)

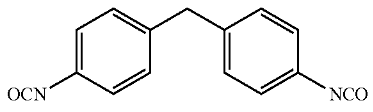

Preferably, the elastic portion of the wiper blade according to one aspect of the present disclosure has the physical properties below, in a case where the elastic portion contains a polyurethane that is a reaction product of a raw material composition that contains an alcohol including a trifunctional or higher polyfunctional alcohol. Specifically, in respective line segments assumed to be drawn on the tip surface and main surface of the elastic portion, parallelly to the tip side edge and at a distance of 0.5 mm from the tip side edge, and with L' as the length of each line segment, P0', P1' and P2' respectively denote points at ⅛L', ½L' and ⅞L' from one end side on the line segment. Samples having been sampled at each of the above P0', P1' and P2' on the tip surface and the main surface are measured by pyrolysis GC/MS (gas chromatography and mass spectrometry). In this case the concentration of trifunctional or higher polyfunctional alcohol in the polyurethane, at the tip surface and the main surface, is preferably from 0.04 mmol/g to 0.39 mmol/g, more preferably from 0.14 mmol/g to 0.39 mmol/g, and yet more preferably from 0.22 mmol/g to 0.39 mmol/g. Hard segment aggregation can be suppressed yet more reliably in a case where the concentration of the trifunctional or higher polyfunctional alcohol is 0.04 mmol/g or higher. Also, excessive development of a crosslinked structure in the polyurethane can be suppressed, and the elastic modulus can be prevented from becoming excessively high, by virtue of the fact that the concentration of the trifunctional or higher polyfunctional alcohol is 0.39 mmol/g or lower Therefore, an elastic portion having the above physical properties can more easily satisfy the above stipulations pertaining to the mean of elastic modulus values (15 to 470 MPa) and coefficient of variation of the elastic modulus (17.6% or lower).

The concentration of the trifunctional or higher polyfunctional alcohol in the polyurethane is calculated in accordance with Formula (2) below.

Concentration of trifunctional or higher polyfunctional alcohol (mmol/g)=[amount (g) of trifunctional or higher polyfunctional alcohol/molecular weight of trifunctional or higher polyfunctional alcohol×1000]/[polyurethane mass (g)] Formula (2)

In a case where the elastic portion of the wiper blade according to the present disclosure contains a polyurethane, the raw material composition of the polyurethane can contain a catalyst for promoting the reaction of the isocyanate compound and the alcohol. Such a catalyst may be for instance a tertiary amine catalyst, and specifically the amines exemplified below. Aminoalcohols such as dimethylethanolamine, N,N,N'-trimethylaminopropylethanolamine and N,N'-dimethylhexanolamine; trialkylamines such as triethylamine; tetraalkyldiamines such as N,N,N'N'-tetramethyl-1,3-butanediamine; as well as triethylenediamine, piperazine-based compounds and triazine-based compounds. Organic acid salts of metals, such as potassium acetate and potassium octylate alkali, can also be used. Metal catalysts ordinarily used in urethanization, for instance dibutyltin dilaurate, can likewise be used. The foregoing may be used singly or in combinations of two or more types.

The raw materials that constitute the elastic portion of the wiper blade may have formulated therein, as needed, pigments, plasticizers, waterproofing agents, antioxidants, ultraviolet absorbers, light stabilizers and so forth, within ranges that do not affect elastic modulus or the coefficient of variation thereof, of the elastic portion.

Surface Treatment

The elastic portion of the wiper blade may be subjected to a surface treatment. Preferred surface treatment methods in the present disclosure include for instance (i) a method having a step of projecting ultraviolet rays onto an object to be treated, and (ii) a method having a step of impregnating an object to be treated through coating thereof with a material for cured region formation, and curing then the material for cured region formation.

(i) Surface Treatment Method Including an Ultraviolet Ray Irradiation Step

The conditions for irradiation of an object to be treated (wiper blade) with ultraviolet rays are not particularly limited. The wavelength of the ultraviolet rays may be 400 nm or shorter, but is preferably 200 nm or longer. The elastic modulus can be increased effectively if the wavelength of the ultraviolet rays is 200 nm or longer. Preferably, the wavelength of the maximum emission peak of light emitted by the light source is from 200 nm to 400 nm. Particularly preferably, the wavelength of the maximum emission peak lies around 254 nm, for instance in the range of 254±1 nm. That is because ultraviolet rays within the above wavelength region, or of the above wavelength, can efficiently generate active oxygen, which modifies the surface of the elastic portion of the wiper blade. In a case where there is a plurality of emission peaks of ultraviolet rays, preferably one of the peaks is present in the vicinity of 254 nm.

The intensity of the light emitted from the light source is not particularly limited and can take on a value as measured using for instance a spectroradiometer (product name: USR-40 V/D, by Ushio Inc.) or an accumulated UV meter (product name: UIT-150-A, UVD-S254, VUV-S172 or VUV-S365, by Ushio Inc.).

The accumulated light intensity of ultraviolet rays projected onto the elastic portion of the wiper blade in the surface treatment step may be selected as appropriate depending on the surface treatment effect that is to be obtained. Irradiation with light from the light source can be carried out for instance depending on the irradiation duration, the output of the light source and the distance to the light source, and for instance it may be prescribed that a desired accumulated light intensity be obtained, for example of 10000 $mJ/cm^2$.

The accumulated light intensity of ultraviolet rays projected onto the elastic portion of the wiper blade can be calculated in accordance with the following method.

Accumulated light intensity ($mJ/cm^2$) of ultraviolet rays=ultraviolet ray intensity ($mW/cm^2$)×irradiation duration (sec)

For instance a high-pressure mercury lamp or a low-pressure mercury lamp can be suitably used as the light source for emitting ultraviolet rays. These light sources are preferable, since they can stably emit ultraviolet rays having a suitable wavelength, with little attenuation derived from irradiation distance, and allow for uniform whole-surface irradiation.

(ii) Surface Treatment Method Having a Step of Impregnating an Object to Be Treated Through Coating of the Object with a Material for Cured Region Formation, and Curing of the Material To form a cured region at the tip surface and the main surface of the elastic portion of the wiper blade as an object to be treated, a material for cured region formation is applied on the tip surface and the main surface, and is caused to impregnate the object from the tip surface and the main surface, to a certain extent in the depth direction from the surface. The object impregnated with the material is thereafter cured. As a result it becomes possible to effectively increase the elastic modulus that is measured at the tip surface and the main surface.

The material for cured region formation can be used after being diluted with a diluting solvent as needed, and can be applied by resorting to means such as dipping, spraying, dispenser coating, brush coating, roller coating or the like. Application of the material for cured region formation may be followed by a heating treatment.

Preferably, the material for cured region formation is impregnated into the polyurethane contained in an elastic member. Impregnation is promoted herein by increasing the concentration, and lowering the viscosity, of the material for cured region formation, so that as a result the material for cured region formation may be heated and impregnated without being diluted. The degree of curing may be adjusted for instance depending on the duration of impregnation or immersion, the heating treatment temperature and heating treatment time after impregnation or immersion, and/or a subsequent standing time.

The temperature of the material for cured region formation may be set to range from about 60° C. to 90° C. The impregnation or immersion time cannot be prescribed categorically, but ranges preferably from about 10 seconds to 180 seconds. A heating treatment may be performed after application of the material for cured region formation onto the cured region. The viscosity of the material for cured region formation that is present on the surface of the polyurethane becomes lowered as a result of the heating treatment; in turn, this allows promoting permeation and diffusion of the material into the polyurethane.

The heating method is not particularly limited, and may be a method that involves passing through a heating furnace or a method that involves blowing a hot air current. Heating furnaces include for instance radiant heating furnaces and circulating air heating furnaces, while devices for forming hot air currents include hot air blowers and far infrared heaters.

The cured region is made wider, which translates into higher elasticity, by setting heating conditions to high temperature and/or to long duration. Among preferred heating conditions, the surface temperature of the treated surface is set for instance to lie in the range from 90° C. to 110° C. Preferably, the heating time is for instance set to lie in the range of 10 minutes to 60 minutes.

In addition, the amount of residual isocyanate during polyurethane molding tends to gradually decrease with time after molding. Therefore, though not limited thereto, the cured region may be formed immediately after molding of the polyurethane. For instance, the cured region may be formed within 3 hours after polyurethane molding. The amount of residual isocyanate can be adjusted also on the basis of the mixing ratio of the composition used at the time of formation of the polyurethane.

In a case where the constituent material of the elastic portion is a polyurethane, the material for cured region formation is not particularly limited, so long as it is a material that can form a cured region by being cured in the polyurethane and can form a cured region on the surface of the polyurethane. Examples of such a material include for instance isocyanate compounds and acrylic resins. The material for cured region formation may be used after having been diluted with a solvent or the like. The solvent used for dilution is not particularly limited so long as it dissolves the material that is used, and examples thereof include toluene, xylene, butyl acetate, methyl isobutyl ketone and methyl ethyl ketone.

In a case where an isocyanate compound is used as the material for cured region formation, an isocyanate compound can be suitably used that has one or more isocyanate groups in the molecule. Aliphatic monoisocyanates such as octadecyl isocyanate (ODI) or aromatic monoisocyanates such as phenyl isocyanate (PHI) can be used as an isocyanate compound having one isocyanate group in the molecule.

As an isocyanate compound having two isocyanate groups in the molecule there may be used compounds ordinarily utilized in the production of polyurethane resins. Concrete examples thereof include the following. 2,4-tolylene diisocyanate (2,4-TDI), 2,6-tolylene diisocyanate (2,6-TDI), 4,4'-diphenylmethane diisocyanate (MDI), m-phenylene diisocyanate (MPDI), tetramethylene diisocyanate (TMDI), hexamethylene diisocyanate (HDI) and isophorone diisocyanate (IPDI). Examples of isocyanate compounds having three or more isocyanate groups in the molecule include the following. 4,4',4"-triphenylmethanetriisocyanate, 2,4,4'-biphenyltriisocyanate and 2,4,4'-diphenylmethanetriisocyanate.

The isocyanate compound having two or more isocyanate groups can also be used in the form of modified derivatives or multimers thereof. Herein MDI exhibiting high crystallinity, i.e. a symmetrical structure, is preferred in order to efficiently increase the hardness of the cured region; more preferred, in terms of workability, is MDI including a modified product, since MDI is then liquid at normal temperature.

Method for Producing an Elastic Portion of a Wiper Blade

The method for producing an elastic portion of a wiper blade is not particularly limited, and can be selected from among known methods. For instance a raw material composition of a polyurethane can be injected into the cavity of a molding mold for an elastic portion of a wiper blade, whereupon the composition is cured through heating, followed by demolding, to yield a molded product. This molded product may be used, as-is, as the wiper blade. Alternatively, the molded product may be shaped as appropriate, for instance by cutting, and be then used as the wiper blade. In that case the tip surface and main surface are preferably shaped through cutting of the elastic portion, since in that case the smoothness of the tip side edge can be increased. As another molding method, a pair of tandem-shaped molded products may be produced in forms so that tip surfaces of elastic portions are in contact while facing each other, the molded products being then cut in the longitudinal direction to produce respective wiper blades.

Configuration of a Wiper Blade for Cleaning

The wiper blade includes a hand grip portion 1 and the elastic portion 2 supported by the hand grip portion 1 and that is pressed against a surface to be cleaned. The wiper blade may have a support portion 3 which is a portion, positioned between the elastic portion 2 and the hand grip portion 1, and which supports the elastic portion 2. The hand grip portion 1 is a portion that can be gripped for instance by an agent of cleaning work, typified by a human or robot hand. As illustrated in FIG. 1A and FIG. 1B, the hand grip portion 1 is connected to the elastic portion directly or via the support portion 3. The hand grip portion 1 may be attachable/detachable to/from, or integrated with, the elastic portion 2 and/or the support portion 3. The hand grip portion 1 extends in a direction that intersects the direction in which the elastic portion 2 extends. The shape of the hand grip portion 1 is not particularly limited, as long as it can be gripped or held by the agent of the cleaning work. A jig for cleaning assistance may be connected to the hand grip portion. Examples of the jig include a jig that extends the hand grip portion, for the purpose of for cleaning a high place. The material of the hand grip portion 1 is not particularly limited, and the hand grip portion 1 may be made of a resin or of a metal.

As illustrated in FIG. 1B, the support portion 3 is a portion, positioned between the elastic portion 2 and the hand grip portion 1, and which supports the elastic portion 2. The wiper blade may lack the support portion 3, with the elastic portion 2 being then directly connected to the hand grip portion 1, as illustrated in FIG. 1A. However, there is preferably a support portion for the purpose of eliciting stable contact of the elastic portion against the member to be cleaned. The support portion 3 is connected to the elastic portion 2 in a direction perpendicular to the direction in which the elastic portion 2 extends. The elastic portion 2 may be attachable/detachable to/from, or integrated with, the support portion 3. The shape of the support portion 3 is not limited so long as it can support the elastic portion 2. For instance the support portion 3 may have a shape so as to clamp part of the elastic portion 2. The material of the support portion 3 is not particularly limited, and the support portion 3 be made of a resin or of a metal.

Method for Using the Wiper Blade

A method for using the wiper blade will be explained next.

The agent of the cleaning work holds the hand grip portion 1 or a support grip portion 4, and moves the wiper blade in a direction intersecting the direction in which the elastic portion 2 extends, while pressing the elastic portion 2 against the surface of the member to be cleaned, to remove dirt thereby. FIGS. 2A and 2B illustrate explanatory diagrams of the state of the cleaning process in which the wiper blade is in contact with and slides on the member to be cleaned during cleaning.

The direction in which the wiper blade is moved is for instance a direction intersecting the direction in which the elastic portion 2 extends; herein, the wiper blade can for instance be used by being moved in direction C of pushing, illustrated in FIG. 2(*a*), and direction W of pulling, illustrated in FIG. 2B.

Dirt may be wetted beforehand using a liquid detergent, water or the like, and be removed together with the liquid detergent, water or the like.

Shape of the Wiper Blade

The shapes and manner of attachment of the elastic portion 2, the support portion 3 and hand grip portion 1 or support grip portion 4 in the wiper blade are not limited. The manner in which the support portion 3 is attached to the elastic portion 2, and the manner in which the hand grip portion 1 or the support grip portion 4 is attached to the support portion 3, are not limited.

In accordance with one aspect of the present disclosure, it is possible to provide a cleaning wiper blade capable of exhibiting excellent wiping ability even with a weak pressing force against the to-be-cleaned surface.

EXAMPLES

The present disclosure will be explained below by way of production examples, working examples and comparative examples, but the disclosure is not limited in any way by these examples. Reagents or industrial chemicals were used as raw materials, besides those listed in the examples and comparative examples. Unless otherwise specified, the language "parts" in the examples and comparative examples refers to mass basis throughout.

Example 1

Preparation of a Starting Material for an Elastic Portion

The materials given in Table 1 were mixed and caused to react at a temperature of 80° C. for 3 hours, to prepare a prepolymer having an NCO content of 10.0 mass %.

TABLE 1

| Material | Amount |
|---|---|
| 4,4'-diphenylmethane diisocyanate (product name: Millionate MT; Tosoh Corporation) (*hereafter "4,4'-MDI", or simply "MDI") | 352.6 g |
| Triphenylmethane-4,4',4"-triisocyanate (product name: Ultite Super CA; by Toho Kasei Kogyo Co. Ltd.) (*hereafter "TTI") as a trifunctional or higher polyfunctional isocyanate | 10.0 g |
| Polybutylene adipate polyester polyol (product name: Nippollan 3027, by Tosoh Corporation, number-average molecular weight 2500) (*hereafter "PBA2500") | 637.4 g |

A curing agent was prepared by mixing the materials given in Table 2.

TABLE 2

| Material | Amount |
|---|---|
| 1,4-butanediol (by Tokyo Chemical Industry Co., Ltd.) (*hereafter "1,4-BD") | 7.0 g |
| Pentaerythritol (by Tokyo Chemical Industry Co., Ltd.) | 26.6 g |
| Polyhexylene adipate polyester polyol (product name: Nippollan 164, by Tosoh Corporation, number average molecular weight 1000) (*hereafter "PHA1000") as a diol | 246.3 g |
| Polycat 46 (product name, by Air Products and Chemicals, Inc.) | 0.13 g |
| N,N'-dimethylhexanolamine (product name: Kaolizer No. 25, by Kao Corporation) (*hereafter "No. 25") | 0.55 g |

A raw material composition of a polyurethane was prepared by mixing the above prepolymer and the above curing agent. The raw material composition was injected into a molding mold for molding an elastic portion of a wiper blade, and was then cured at a temperature of 130° C. for 2 minutes. This was followed by demolding, to yield a polyurethane molded product. Herein a Release agent A was applied beforehand onto the interior of the molding mold. The Release agent A is a mixture of the materials given in Table 3.

TABLE 3

| Material | Amount |
|---|---|
| ⌈ELEMENT 14 PDMS 1000-JC⌋ (product name, by Momentive Performance Materials Inc.) | 5.06 g |
| ⌈ELEMENT 14 PDMS 10K-JC⌋ (product name, by Momentive Performance Materials Inc.) | 6.19 g |
| ⌈SR1000⌋ (product name, by Momentive Performance Materials Inc.) | 3.75 g |
| ⌈EXXSOL DSP145/160⌋ (product name, by Andoh Parachemie Co., Ltd.) | 85 g |

The tip side of the polyurethane molded product was cut, to produce an elastic portion having a main surface and a tip surface that made up a tip side edge together with the main surface. The lengths in the thickness direction, the transverse direction and the longitudinal direction were set to 1.8 mm, 20 mm and 300 mm, respectively. The obtained elastic portion was evaluated as follows.

Evaluation 1: Measurement of the Concentration of a Polyfunctional Alcohol Species Polyfunctional alcohols were detected by pyrolysis GC/MS (gas chromatography and mass spectrometry). The measurement conditions are set out below.

Sampling positions: in respective line segments assumed to be drawn on the tip surface and main surface of the elastic portion, parallelly to the tip side edge and at a distance of 0.5 mm from the tip side edge, and with L' as the length of each line segment, P0', P1' and P2' were respectively set at ⅛L', ½L' and ⅞L' from one end side on the line segment. Samples having been respectively sampled at the above P0', P1' and P2' on the tip surface and the main surface were measured in accordance with the method below. In the above sampling, members of polyurethane or the like were cut using a biocutter.

Device:

Pyrolyzer: product name: EGA/PY-3030D, by Frontier Laboratories Ltd.,

Gas chromatography device: product name: TRACE 1310 gas chromatograph, by Thermo Fisher Scientific Inc., Mass spectrometer: product name: ISQLT, by Thermo Fisher Scientific Inc.

Pyrolysis temperature: 500° C.

GC column: stainless steel capillary column having 0.25 mm inner diameter x 30 m Stationary phase: 5% phenylpolydimethylsiloxane Temperature rise conditions: holding at 50° C. for 3 minutes, and heating up to 300° C. at 8° C/minute MS conditions: mass number range m/z from 10 to 650

Scanning speed: 1 sec/scan

Polyfunctional alcohol species were characterized by GC/MS. A calibration curve was prepared through GC analysis of known concentrations of a qualitatively characterized polyfunctional alcohol species, and the species was quantified on the basis of GC peak area ratios. The arithmetic mean value of numerical values obtained for the respective samples at the above P0', P1' and P2', at the tip surface and the main surface, were taken as the concentration of polyfunctional alcohol at the tip surface and at the main surface.

Evaluation 2: Measurement of M1 to M3

Herein M1 to M3 were measured relying on a direct sample introduction method (DI method) in which the sample is introduced directly into an ion source, bypassing a gas chromatograph (GC). The apparatus that was used was an ion trap-type GC/MS (product name: POLARIS Q, by Thermo Fisher Scientific Inc.), with a direct exposure probe (DEP) being used as a direct introduction probe. In respective line segments assumed to be drawn on the tip surface and the main surface of the elastic portion, parallelly to the tip side edge, at a distance of 0.5 mm from the tip side edge, and with L' as the length of each line segment, P0', P1' and P2' were respectively set at ⅛L', ½L' and ⅞L' from one end side on the line segment. Samples having been respectively sampled at the above P0', P1' and P2' on the tip surface and the main surface were measured in accordance with the method below. At the time of sampling, members of polyurethane or the like were cut using a biocutter. About 0.1 μg of each of the samples having been sampled at each of the above P0', P1' and P2', at the tip surface and the main surface, were fixed to a filament positioned at the tip of the probe, and the whole was directly inserted into an ionization chamber. This was followed by rapid heating from room temperature up to 1000° C. at a constant ramp rate (about 10° C./s), whereupon the resulting vaporized gas was detected using a mass spectrometer.

The total of the integrated intensity of all peaks in an obtained total ion current thermogram was taken as a detected amount M1 of all ions.

Further, (M2/M1) was calculated using the above values of M1 and M2, where M2 is the total of peak integrated intensities in an extracted ion thermogram of an m/z value derived from the trifunctional or higher polyfunctional isocyanate. Further, (M3/M1) was calculated using values of M1 and M3, where M3 is the total of peak integrated intensities in an extracted ion thermogram of an m/z value derived from the diisocyanate. The arithmetic mean values of numerical values obtained from respective samples at P0', P1' and P2', at the tip surface and the main surface, were taken as respective values of (M2/M1) and (M3/M1) at the tip surface and the main surface.

In the present example TTI, used as the trifunctional or higher polyfunctional isocyanate, has the structure represented by Chemical formula (3) below. In the extracted ion thermogram obtained in the present evaluation there was detected a peak derived from a cation product of TTI having a peak top at an m/z position from 366.5 to 367.5. In the in the present example, therefore, this peak integrated intensity was taken as M2.

(3)

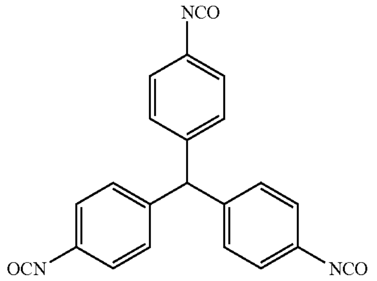

In another example described below, peaks derived from cation products of polymeric MDI, having peak tops at positions in a range where an m/z value denoting n=1 was from 380.5 to 381.5, a range where an m/z value denoting n=2 was from 511.5 to 512.5, a range where an m/z value denoting n=3 was from 642.5 to 643.5, and a range where an m/z value denoting n=4 was from 773.5 to 774.5, of the structure represented by Chemical formula (1)', were detected in an extracted ion thermogram obtained in the present evaluation, for the elastic portion made up of a polyurethane synthesized using polymeric MDI as the trifunctional or higher polyfunctional isocyanate. Therefore, the total of peak integrated intensities was taken as M2, in the above example.

Similarly, tris(phenylisocyanate)thiophosphate (TPTI), used as the trifunctional or higher polyfunctional isocyanate in a below-described example, has a structure represented by Chemical formula (4). In the extracted ion thermogram obtained in the present evaluation there was detected a peak derived from a cation product of TPTI having a peak top at an m/z position from 464.5 to 465.5. Therefore, the total of the peak integrated intensities was taken as M2, in the above example.

(4)

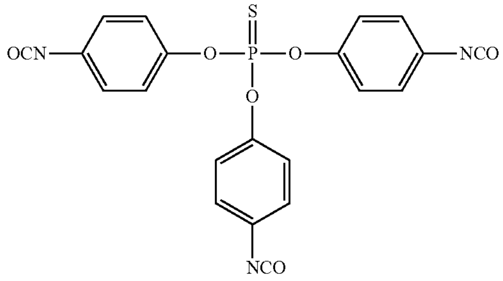

In the extracted ion thermogram obtained in the present evaluation there was detected a peak derived from a cation product of 4,4'-MDI represented by Chemical formula (2), which is a diisocyanate, having a peak top at an m/z position from 249.5 to 250.5. Therefore, the above peak integrated intensity was taken as M3.

Evaluation 3: Measurement of Elastic Modulus

Elastic modulus by SPM was measured in accordance with the method below, using a scanning probe microscope (SPM) (product name: MFP-3D Origin, by Oxford Instruments plc).

Firstly, samples were prepared as follows. Upon hypothetical drawing of a first line segment of length L on the tip surface of the elastic portion, parallelly to the tip side edge and at a distance of 10 μm from the tip side edge, there were cut out three 2 $mm^2$ square measurement samples having one side parallel to the first line segment and having respective barycenters at points P0, P1 and P2 at ⅛L, ½L and ⅞L from one end side on the first line segment. A cryomicrotome (UC-6 (product name), by Leica Microsystems GmbH) was used to cut out, from the above measurement samples, respective 100 $\mu m^2$ polyurethane flakes having a thickness of 1 μm, in a −50° C. state, having one side parallel to the first line segment and having respective barycenters set to P0, P1 and P2. Three measurement samples were thus prepared. Each obtained measurement sample was placed on a smooth silicon wafer and was allowed to stand in an environment at room temperature of 25° C. and humidity of 50%, for 24 hours.

Next, the silicon wafer having the measurement sample placed thereon was set on an SPM stage, and an observation was performed using the SPM. The spring constant and proportionality constant of a silicon-made cantilever (product name: OMCL-AC160, by Olympus Corporation, tip curvature radius: 8 nm) were ascertained beforehand in accordance with a thermal noise method with an SPM device, as follows (spring constant: 30.22 nN/nm, proportionality constant: 82.59 nm/V).

The cantilever was tuned beforehand, and resonance frequencies of the cantilever were determined (285 KHz (first order) and 1.60 MHz (higher order)).

The measurement mode of the SPM was an AM-FM mode, the free amplitude of the cantilever was set to 3 V (first order) and 25 mV (higher order), the set point amplitude was set to 2 V (first order), and scanning was carried out under conditions of scanning speed of 1 Hz, and 256 vertical and 256 horizontal scanning points, in a 70 μm×70 μm square field of view, to acquire a phase image. The position of the field of view was selected so that P0, P1 and P2 of each measurement sample was present in the center of the field of view, and one side of the field of view was parallel to the first line segment.

A site of each measurement sample where the elastic modulus was to be measured was designated as a result of force curve measurement, on the basis of the obtained phase image. Specifically, measurement sites were designated in the form of positions corresponding to 70000 points at a 0.1 μm pitch (spacing), transversally and longitudinally, in rectangular regions having respective barycenters at P0, P1 and P2, and having a 70 μm-long side parallel to the first line segment and a 10 μm-long side perpendicularly intersecting the first line segment, within a 70 μm×70 μm phase image, as illustrated in FIG. 5 and FIG. 6.

Thereafter, force curve measurement in contact mode was performed once per point, for all points. In the force curve measurement a piezoelectric element which is the drive source of the cantilever is controlled so that the tip of the cantilever snaps back once deflection derived from contact with the sample surface takes on a constant value. The snap-back point at this time is referred to as a trigger value that denotes the specific extent of voltage increase, from the deflection voltage at the start of the force curve, at which the cantilever snaps back. In the present measurement force curves were measured with the trigger value set to 0.2 V. As other force curve measurement conditions, the distance from the tip position of the cantilever in a standby state up to snap-back of the cantilever at the trigger value was set to 500 nm, and scanning speed (speed at which the probe reciprocates once) was set to 1 Hz. Thereafter, fitting based on the Hertz theory was applied to the obtained force curves, one by one, to calculate the elastic modulus. The elastic modulus (Young's modulus) according to the Hertz theory was calculated in accordance with the following Formula (*1).

$$F=(4/3)E^{*}R^{1/2}d^{3/2} \quad \text{Formula (*1)}$$

In Formula (*1), F denotes the force exerted on the sample by the cantilever at the point in time at which the cantilever snaps back, E* is a composite elastic modulus, R is the radius of curvature (8 nm) of the tip of the cantilever, and d is the extent of deformation the sample at the point in time at which the cantilever snaps back. Further, d is calculated from Formula (*2) below.

$$d=\Delta z-D. \quad \text{Formula (*2)}$$

In Formula (*2) Δz is the amount of displacement of the piezoelectric element from the point in time at which the tip of the cantilever touches the sample until the tip snaps back, and D is the amount of warp of the cantilever at the point in time at which the cantilever snaps back. Further, D was calculated on the basis of Formula (*3) below.

$$D=\alpha\cdot\Delta V\text{deflection} \quad \text{Formula (*3)}$$

In Formula (*3), α is the proportionality constant of the cantilever, and ΔVdeflection is the amount of change in deflection voltage from that when the cantilever starts touching the sample until the point in time at which the cantilever snaps back.

Further, F was calculated on the basis of Formula (*4) below.

$$F=\kappa\cdot D \quad \text{Formula (*4)}$$

In Formula (*4), κ is the spring constant of the cantilever. Herein ΔV deflection and Δz are actually measured values, and hence E* in Formula (*1) was worked out on the basis of Formulae (*1) to (*4). The elastic modulus (Young's modulus) Es to be obtained was calculated on the basis of Formula (*5) below.

$$1/E^{*}=[(1-Vs^{2})/Es]-[(1-Vi^{2})/Ei] \quad \text{Formula (*5)}$$

Vs: Poisson's ratio of the sample (fixed at 0.33 in the present example);

Vi: Poisson's ratio of the cantilever tip (the value for silicon was used in the present example);

Ei: Young's modulus of the cantilever tip (the value for silicon was used in the present example).

Elastic modulus was measured at 70000 points at a 0.1 μm pitch (spacing), transversally and longitudinally, in rectangular observation regions (three 10 μm×70 μm observation regions) having respective barycenters at P0, P1 and P2, and having a 70 μm-long side parallel to the first line segment and a 10 μm-long side perpendicularly intersecting the first line segment. Then the mean of elastic modulus values calculated from force curves for the total of 210000 points was taken as the elastic modulus of the tip surface. A standard deviation was calculated from the elastic modulus of the total of 210000 points. The coefficient of variation of the elastic modulus of the first tip surface was calculated on the basis of Formula 1 below, from the mean of elastic modulus values and the standard deviation.

Coefficient of variation (%)=(standard deviation/mean of elastic modulus values)×100 Formula (1)

The mean of elastic modulus values and the coefficient of variation of elastic modulus for the main surface were calculated in the same manner as above.

Evaluation 4: Evaluation of Wiping Performance

Figure 8:
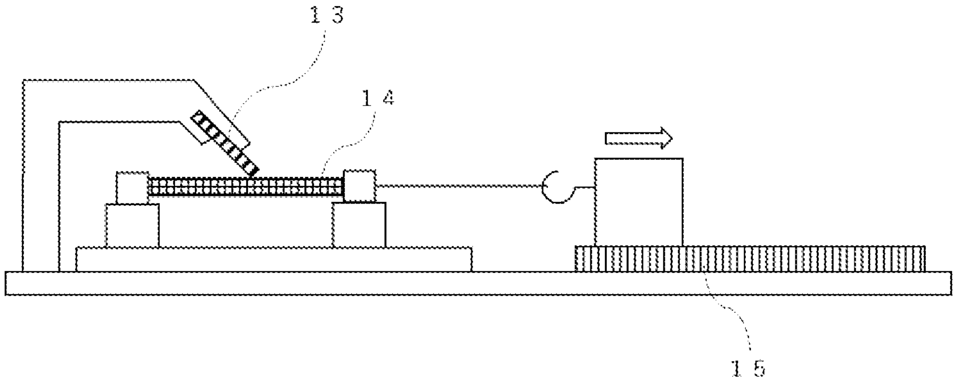
FIG. 8 is a schematic diagram of a tester for evaluation of the wiping performance of a wiper blade.
Figure 9:
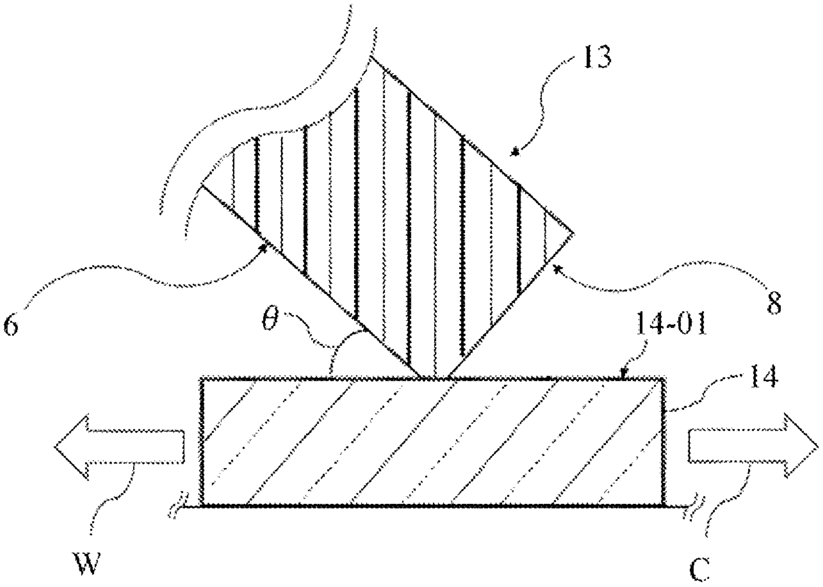
FIG. 9 is an enlarged-view diagram of a portion of contact between an elastic portion of a wiper blade and a glass surface.
Figure 10:
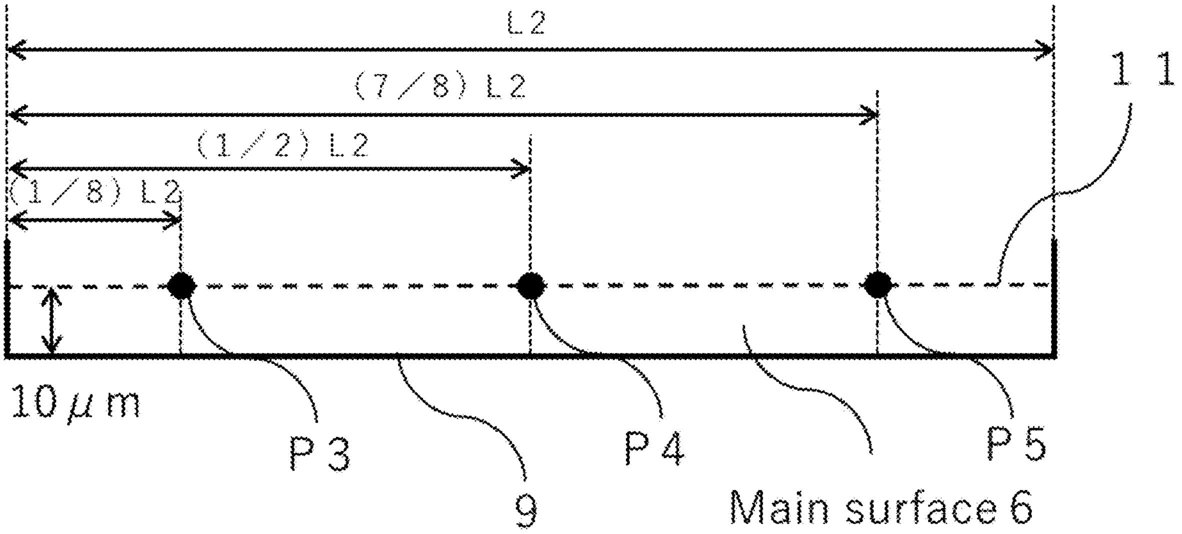
FIG. 10 is an enlarged-view diagram of the vicinity of a second line segment.
Figure 11:
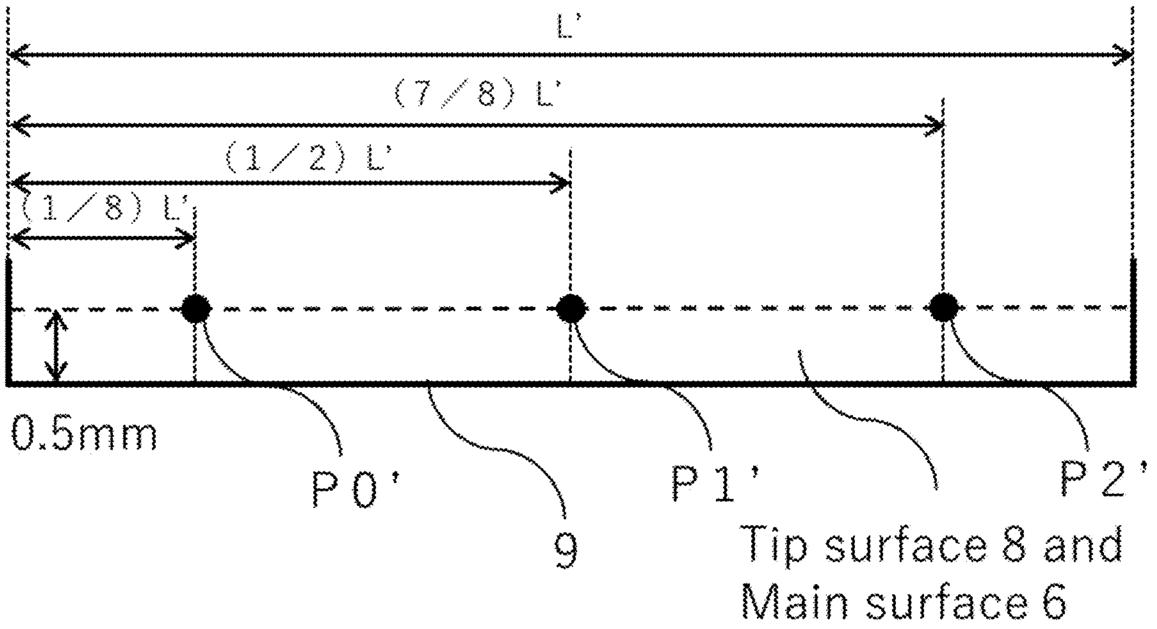
FIG. 11 is an enlarged-view diagram of the vicinity of line segment L'.

An elastic portion 13 was clamped to a gripping part 801 of the evaluation device illustrated in FIG. 8, over the total length of the elastic portion 13 in the longitudinal direction thereof, and the wipe-off performance by the wiper blade on dirt on the glass surface was evaluated in the experiment below. The elastic portion 13 was gripped by gripping part, from the mounting side up to a 10 mm position, on the main surface side, and from the mounting side up to a 15 mm position, on reverse side to the main surface. Silicone oil (product name: KF-96-50cs, by Shin-Etsu Chemical Co., Ltd.) was applied onto the entire surface of a glass plate 14 as a member to be cleaned, in a state thus simulating an oil film. Then, the elastic portion 13 was brought into contact with the surface of the glass plate 14 onto which the silicone oil had been applied (hereafter also referred to as "surface to be cleaned"). FIG. 9 illustrates an enlarged-view diagram of the contact portion between the elastic portion of the wiper blade and the surface to be cleaned. As illustrated in FIG. 9, the elastic portion 13 was brought into contact so that an angle θ formed by the main surface 6 and the surface to be cleaned 14-01 was 45 degrees. The glass plate 14 was caused to reciprocally move in the directions of arrows W and C in FIG. 9 at a speed of 10 mm/sec using an electric ROBO cylinder 15 (product name: RCP4-SA5C, by IAI Corporation). Then, the wiped state of the silicone oil on the surface to be cleaned 14-01 was captured, visually and using a camera, from the surface of the glass plate 14 on the reverse side from that of the surface to be cleaned 14-01. A ratio of the surface area of the portion from which the silicone oil had been removed relative to the contact surface area of the wiper blade 13 with the surface to be cleaned 14-01 (hereafter also referred to as "silicone oil removal area ratio (%)") was calculated and was evaluated in accordance with the criteria below. The pressing force applied to the glass surface per 1 m length of the elastic portion in the longitudinal direction was set to two levels, namely 7 N/m and 15 N/m, and the silicone oil removal area ratio was calculated for each level.

Evaluation Criteria

- Rank A: silicone oil film removal area ratio of 95% or higher
- Rank B: silicone oil film removal area ratio from 90% to less than 95%
- Rank C: silicone oil film removal area ratio from 85% to less than 90%
- Rank D: silicone oil film removal area ratio from 80% to less than 85%
- Rank E: silicone oil film removal area ratio lower than 50%

Examples 2 to 32

Table 4 to Table 7 set out the types and amounts of various materials for the prepolymer, and the types and amounts of the various materials for the curing agent. Respective elastic portions were produced and evaluated in the same manner as in Example 1, except for the remarks below.

In Example 3 tris(phenylisocyanate)thiophosphate (product name: Ultite Super CAII, by Toho Kasei Kogyo Co. Ltd.) (TPTI) was used as the trifunctional or higher polyfunctional isocyanate.

In Example 5 polymeric MDI (product name: Millionate MR-400, by Tosoh Corporation) (hereafter referred to as MR400) was used as the trifunctional or higher polyfunctional isocyanate. The NCO% in Example 5 was 10.2 mass %.

In Example 6 glycerin (Tokyo Chemical Industry Co., Ltd.) was used as the polyfunctional alcohol for the curing agent.

In Example 13 trimethylolpropane (Tokyo Chemical Industry Co., Ltd.) (hereafter also referred to as "TMP") was used as the trifunctional or higher polyfunctional alcohol for the curing agent.

In Example 14 polymeric MDI (product name: Millionate MR-200, by Tosoh Corporation) (hereafter also referred to as MR200) was used as the trifunctional or higher polyfunctional isocyanate for the prepolymer.

In Example 18 a polybutylene adipate polyester polyol having a number-average molecular weight of 1000 (product name: Nippollan 4009, by Tosoh Corporation) (hereafter also referred to as PBA1000) was used as the polyol for the curing agent.

In Example 19 a polybutylene adipate polyester polyol having a number-average molecular weight of 2600 (product name: Nippollan 136, by Tosoh Corporation) (hereafter also referred to as PHA2600) was used as the polyol for the prepolymer.

In Example 29 polymeric MDI (product name: Cosmonate M-200, by Mitsui Chemicals, Inc.) (hereafter also referred to as "M200") was used as the trifunctional or higher polyfunctional isocyanate for the prepolymer. Polytetramethylene ether glycol having a number-average molecular weight of 2000 (product name: PTG-2000SN, by Hodogaya Chemical Co., Ltd.) (hereafter also referred to as "PTG2000SN") was used as the polyol for the prepolymer. The NCO content of the prepolymer of Example 29 was 7.9 mass %. Polytetramethylene ether glycol having a number-average molecular weight of 1000 (product name: PTG-1000SN, by Hodogaya Chemical Co., Ltd.) (hereafter also referred to as "PTG1000SN") was used as the polyol for the curing agent. The curing time was set to 6 minutes.

The curing time of the raw material composition was set to 6 minutes also in Examples 30 to 32.

Example 33

A prepolymer having an NCO content of 9.0 mass % was obtained using the materials for a prepolymer as given in Table 7. Herein PBA2000 is a polybutylene adipate polyester polyol having a number-average molecular weight of 2000 (product name: Nippollan 4010, by Tosoh Corporation). A curing agent was prepared using the materials for a curing agent as given in Table 7. A raw material composition prepared through mixing of the above prepolymer and the above curing agent was injected into a molding mold for a wiper blade elastic portion, similarly to Example 1. The composition was cured at a temperature of 130° C. for 10 minutes. This was followed by demolding and secondary curing at a temperature of 130° C. for 60 minutes, to yield an elastic portion according to the present example.

Example 34

A wiper blade elastic portion was produced and evaluated in the same way as in Example 1 but herein the types and use amounts of the various materials for the prepolymer and the types and use amounts of the various materials for the curing agent were as given in Table 7. Next, a wiper blade elastic portion according to the present example was obtained at the main surface and the tip surface of the wiper blade elastic portion. A low-pressure mercury ozoneless lamp (by Toshiba Lighting & Technology Corporation) having a maximum emission wavelength peak at a wavelength of 254 nm was used as the light source of ultraviolet rays. The wiper blade elastic portion was evaluated in the same way as in Example 1.

Examples 35 and 36

Wiper blades were produced and evaluated in the same way as in Example 1 but herein the types and use amounts of the various materials for the prepolymer and the types and use amounts of the various materials for the curing agent were as given in Table 7. Wiper blade elastic portions according to Examples 35 and 36 were then obtained through irradiation of the obtained wiper blades with ultraviolet rays in the same way as in Example 34, but herein the accumulated light intensity was modified to the values given in Table 7. These wiper blade elastic portions were evaluated in the same way as in Example 1.

Example 37

A prepolymer having an NCO content of 7.0 mass % was obtained using the materials for a prepolymer as given in Table 7. A curing agent was prepared using the various materials for a curing agent as given in Table 7. A raw material composition resulting from mixing the above prepolymer and curing agent was injected into a molding mold for a wiper blade elastic portion, and was cured at a temperature of 130° C. for 10 minutes, in the same way as in Example 1. This was followed by demolding and secondary curing at a temperature of 130° C. for 60 minutes, to yield a wiper blade elastic portion.

The main surface and the tip surface of the obtained wiper blade elastic portion were irradiated with ultraviolet rays, to an accumulated light intensity of 1968 $mJ/cm^2$, similarly to Example 34. A wiper blade elastic portion according to the present example was thus obtained.

Example 38

A wiper blade elastic portion was produced and evaluated in the same way as in Example 1 but herein the types and use amounts of the various materials for the prepolymer and the types and use amounts of the various materials for the curing agent were as given in Table 7.

Examples 39 and 40

Wiper blades were produced and evaluated in the same way as in Example 1 but herein the types and use amounts of the various materials for the prepolymer and the types and use amounts of the various materials for the curing agent were as given in Table 7. Wiper blade elastic portions according to Examples 39 and 40 were then obtained through irradiation of the obtained wiper blades with ultraviolet rays in the same way as in Example 34, but herein the accumulated light intensity was modified to the values given in Table 7. These wiper blade elastic portions were evaluated in the same way as in Example 1.

Example 41

A prepolymer having an NCO content of 9.0 mass % was obtained using the materials for a prepolymer as given in Table 8. A curing agent was prepared using the various materials for a curing agent as given in Table 8. A raw material composition resulting from mixing the above prepolymer and curing agent was injected into a molding mold for a wiper blade elastic portion, and was cured at a temperature of 130° C. for 10 minutes, in the same way as in Example 1. This was followed by demolding and secondary curing at a temperature of 130° C. for 60 minutes, to yield a polyurethane molded product. The obtained polyurethane molded product was processed in the same way as in Example 1, to yield a wiper blade elastic portion according to the present example.

Examples 42 to 44

Prepolymers were prepared in the same way as in Example 41, but herein the types and use amounts of the various materials for the prepolymer were as given in Table 7. The NCO content of the prepolymer of Example 42 was 8.2 mass %, the NCO content of the prepolymer of Example 43 was 15.0 mass %, and the NCO content of the prepolymer of Example 44 was 18.0 mass %.

A curing agent was prepared in the same way as in Example 41, but herein the various materials and use amounts thereof for the curing agent were as given in Table 7. The elastic portions of the wiper blades according to Examples 42 to 44 were produced and evaluated in the same manner as in Example 41, but using herein these prepolymers and curing agent.

Examples 45 and 46

The wiper blade elastic portion obtained in Example 44 was irradiated with ultraviolet rays in the same way as in Example 34, but herein the accumulated light intensity was set to the values given in Table 7, to yield wiper blade elastic portions according to Examples 45 and 46. The obtained wiper blade elastic portions were evaluated in the same way as in Example 1.

Examples 47 to 50

Prepolymers were prepared in the same way as in Example 41, but herein the types and use amounts of the various materials for the prepolymer were as given in Table 7. The NCO content of the prepolymer according to Example 47 was 10.0 mass %, the NCO content of the prepolymer according to Example 48 was 9.6 mass %, the NCO content of the prepolymer according to Example 49 was 9.3 mass %, and the NCO content of the prepolymer according to Example 50 was 9.2 mass %.

A curing agent was prepared in the same way as in Example 41, but herein the various materials and use amounts thereof for the curing agent were as given in Table 7. The elastic portions of the wiper blades according to Examples 47 to 50 were produced in the same way as in Example 41, but using herein the above prepolymers and curing agent, and the produced wiper blades were evaluated.

Example 51

Herein regions extending 2 mm from the tip side edge, of the main surface and the tip surface, of a wiper blade elastic portion obtained in the same way as in Example 37 were immersed for 1 minute in 4,4'-MDI dissolved at a temperature of 80° C. Thereafter, 4,4'-MDI adhered to the surface of the immersed portion of the wiper blade elastic portion was wiped off using a sponge soaked with butyl acetate. The wiper blade elastic portion was then aged for 24 hours in an environment at a temperature of 23° C. and 50% relative humidity, to yield the wiper blade elastic portion according to the present example in which a cured region was formed in the vicinity of the tip side edge, at the main surface and the tip surface. The wiper blade elastic portion was evaluated in the same way as in Example 1.

Example 52

A wiper blade elastic portion according to the present example was produced in the same way as in Example 51, but herein with heating for 30 minutes at a temperature of 100° C. after the 4,4'-MDI adhered to the surface of the soaked portion of the wiper blade elastic portion had been wiped off; the wiper blade elastic portion was evaluated in the same way as in Example 1.

Example 53

A wiper blade elastic portion according to the present example was obtained by subjecting a wiper blade elastic portion produced in the same way as in Example 4 to the same surface treatment as that of Example 51, but setting herein the immersion time in 4,4'-MDI to 3 minutes. The wiper blade elastic portion was evaluated in the same way as in Example 1.

Example 54

A wiper blade elastic portion according to the present example was produced in the same way as in Example 53, but herein with heating for 30 minutes at a temperature of 100° C. after the 4,4'-MDI adhered to the surface of the soaked portion of the wiper blade elastic portion had been wiped off; the wiper blade elastic portion was evaluated in the same way as in Example 1.

Comparative Example 1

A prepolymer having an NCO content of 14.0 mass % was prepared using the various materials for a prepolymer as given in Table 10. A curing agent was prepared using the various materials for a curing agent as given in Table 10. A raw material composition resulting from mixing the above prepolymer and curing agent was injected into a molding mold for a wiper blade elastic portion, and was cured at a temperature of 130° C. for 10 minutes, in the same way as in Example 1. This was followed by demolding and secondary curing at a temperature of 130° C. for 60 minutes, to yield a polyurethane molded product. The obtained polyurethane molded product was processed in the same way as in Example 1, to produce a wiper blade elastic portion according to the present example. The obtained wiper blade was evaluated in the same way as in Example 1.

Comparative Example 2

A prepolymer having an NCO content of 9.0 mass % was obtained using the materials for a prepolymer as given in Table 10. A curing agent was prepared using the various materials for a curing agent as given in Table 10. A wiper blade elastic portion was produced, and evaluated, in the same way as in Comparative example 1, but using herein the above prepolymer and curing agent.

Comparative Example 3

A prepolymer having an NCO content of 9.0 mass % was obtained using the materials for a prepolymer as given in Table 10. A curing agent was prepared using the various materials for a curing agent as given in Table 10. A wiper blade elastic portion was produced in the same way as in Comparative example 1, but using herein the above prepolymer and curing agent. A wiper blade elastic portion according to the present comparative example was obtained by irradiating the obtained wiper blade elastic portion with ultraviolet rays in the same way as in Example 34, but herein the accumulated light intensity was set to 8200 mJ/cm$^2$. The obtained wiper blade elastic portion was evaluated in the same way as in Example 1.

Comparative Example 4

To 100 parts by mass of natural rubber there were added 48.0 parts by mass of carbon black (product name: Toka Black #7360SB, by Tokai Carbon Co., Ltd.), 5.0 parts by mass of zinc oxide (product name: Zinc White 2, by Sakai Chemical Industry Co., Ltd.), 1.0 part by mass of zinc stearate (product name: SZ-2000, by Sakai Chemical Industry Co., Ltd.), and 20 parts by mass of calcium carbonate (product name: Nanox #30, by Maruo Calcium Co., Ltd.), and the whole was kneaded for 15 minutes in a sealed mixer adjusted to a temperature of 50° C.

To the resulting kneaded product there were further added 1.2 parts by mass of sulfur and 4.5 parts by mass of tetrabenzylthiuram sulfide (TBzTD) (product name: Perkacit TBzTD, by FlexSys, Inc.), as vulcanizing agents. The resulting product was kneaded for 10 minutes using a two-roll machine cooled down to a temperature of 25° C., to yield a rubber composition. The obtained rubber composition was placed in a molding mold for a wiper blade elastic portion and was compression-vulcanized at 170° C. for 20 minutes to obtain a wiper blade elastic portion. The obtained wiper blade elastic portion was evaluated in the same way as in Example 1.

Tables 4 to 10 set out the evaluation results of the respective examples and comparative examples.

TABLE 4

| | | | | Example 1 | Example 2 | Example 3 | Example 4 | Example 5 |
|---|---|---|---|---|---|---|---|---|
| Formulation | Prepolymer | MDI amount (g) | | 352.6 | 357.2 | 358.2 | 343.3 | 334.6 |
| | | Trifunctional or higher polyfunctional isocyanate | Type | TTI | TTI | TPTI | TTI | MR400 |
| | | | Amount (g) | 10.0 | 5.0 | 5.0 | 20.0 | 40.0 |
| | | Polyol | Type | PBA2500 | PBA2500 | PBA2500 | PBA2500 | PBA2500 |
| | | | Amount (g) | 637.4 | 637.8 | 636.8 | 636.7 | 625.4 |

TABLE 4-continued

| | | | | | | | | |
|---|---|---|---|---|---|---|---|---|
| | Curing agent | Trifunctional or higher polyfunctional alcohol | Type | Penta-erythritol | Penta-erythritol | Penta-erythritol | Penta-erythritol | Penta-erythritol |
| | | | Amount (g) | 26.6 | 24.3 | 24.3 | 46.7 | 28.1 |
| | | 1,4-BD amount (g) | | 7.0 | 9.6 | 9.6 | 7.8 | 11.1 |
| | | Polyol | Type | PHA1000 | PHA1000 | PHA1000 | PHA1000 | PHA1000 |
| | | | Amount (g) | 246.3 | 248.9 | 248.8 | 334.5 | 287.7 |
| | | Polycat 46 amount (g) | | 0.13 | 0.13 | 0.13 | 0.13 | 0.13 |
| | | No. 25 amount (g) | | 0.55 | 0.55 | 0.55 | 0.55 | 0.55 |
| | Post-treatment | | | No | No | No | No | No |
| Elastic modulus | Tip surface | Mean value (MPa) | | 20 | 15 | 16 | 15 | 20 |
| | | Standard deviation (MPa) | | 1.000 | 0.945 | 0.896 | 0.740 | 0.780 |
| | | Coefficient of variation | | 5.0 | 6.3 | 5.6 | 4.9 | 3.9 |
| | Main surface | Mean value (MPa) | | 21 | 15 | 17 | 16 | 19 |
| | | Standard deviation (MPa) | | 1.100 | 0.960 | 0.896 | 0.730 | 0.780 |
| | | Coefficient of variation | | 5.2 | 6.4 | 5.3 | 4.6 | 4.1 |
| Concentration of trifunctional or higher polyfunctional alcohol (mmol/g) | | Tip surface | | 0.15 | 0.14 | 0.14 | 0.24 | 0.16 |
| | | Main surface | | 0.15 | 0.14 | 0.14 | 0.25 | 0.16 |
| M2/M1 | | Tip surface | | 0.0011 | 0.0007 | 0.0008 | 0.0010 | 0.0016 |
| | | Main surface | | 0.0010 | 0.0008 | 0.0008 | 0.0011 | 0.0015 |
| M3/M1 | | Tip surface | | 0.0964 | 0.0974 | 0.0977 | 0.0865 | 0.0882 |
| | | Main surface | | 0.0966 | 0.0973 | 0.0977 | 0.0864 | 0.0883 |
| Evaluation rank of wiping performance | | Pressing force 15 N/m | C direction | B | B | B | B | B |
| | | | W direction | C | C | C | C | C |
| | | Pressing force 7 N/m | C direction | B | C | B | B | B |
| | | | W direction | C | C | C | C | C |

| | | | | Example 6 | Example 7 | Example 8 | Example 9 | Example 10 |
|---|---|---|---|---|---|---|---|---|
| Formu-lation | Prepolymer | MDI amount (g) | | 301.9 | 301.9 | 269.2 | 281.0 | 281.0 |
| | | Trifunctional or higher polyfunctional isocyanate | Type | MR400 | MR400 | MR400 | TPTI | TPTI |
| | | | Amount (g) | 80.0 | 80.0 | 120.0 | 120.0 | 120.0 |
| | | Polyol | Type | PBA2500 | PBA2500 | PBA2500 | PBA2500 | PBA2500 |
| | | | Amount (g) | 618.1 | 618.1 | 610.8 | 599.0 | 599.0 |
| | Curing agent | Trifunctional or higher polyfunctional alcohol | Type | Glycerin | Glycerin | Glycerin | Glycerin | Glycerin |
| | | | Amount (g) | 29.0 | 26.7 | 27.3 | 44.6 | 27.5 |
| | | 1,4-BD amount (g) | | 11.5 | 10.6 | 13.6 | 4.1 | 10.9 |
| | | Polyol | Type | PHA1000 | PHA1000 | PHA1000 | PHA1000 | PHA1000 |
| | | | Amount (g) | 297.2 | 273.1 | 300.3 | 356.7 | 281.1 |
| | | Polycat 46 amount (g) | | 0.13 | 0.13 | 0.13 | 0.13 | 0.13 |
| | | No. 25 amount (g) | | 0.55 | 0.55 | 0.55 | 0.55 | 0.55 |
| | Post-treatment | | | No | No | No | No | No |
| Elastic modulus | Tip surface | Mean value (MPa) | | 26 | 29 | 32 | 32 | 34 |
| | | Standard deviation (MPa) | | 0.800 | 0.900 | 0.940 | 1.120 | 1.010 |
| | | Coefficient of variation | | 3.1 | 3.1 | 2.9 | 3.5 | 3.0 |
| | Main surface | Mean value (MPa) | | 25 | 30 | 33 | 32 | 35 |
| | | Standard deviation (MPa) | | 0.810 | 0.920 | 0.950 | 1.110 | 1.030 |
| | | Coefficient of variation | | 3.2 | 3.1 | 2.9 | 3.5 | 2.9 |
| Concentration of trifunctional or higher polyfunctional alcohol (mmol/g) | | Tip surface | | 0.24 | 0.22 | 0.22 | 0.33 | 0.23 |
| | | Main surface | | 0.23 | 0.22 | 0.22 | 0.34 | 0.23 |
| M2/M1 | | Tip surface | | 0.0029 | 0.0029 | 0.0041 | 0.0040 | 0.0042 |
| | | Main surface | | 0.0029 | 0.0029 | 0.0041 | 0.0041 | 0.0042 |
| M3/M1 | | Tip surface | | 0.0789 | 0.0806 | 0.0702 | 0.0699 | 0.0745 |
| | | Main surface | | 0.0788 | 0.0806 | 0.0702 | 0.0698 | 0.0745 |
| Evaluation rank of wiping performance | | Pressing force 15 N/m | C direction | B | B | A | A | A |
| | | | W direction | B | B | A | A | A |
| | | Pressing force 7 N/m | C direction | B | B | A | B | A |
| | | | W direction | C | C | B | B | B |

TABLE 5

| | | | | Example 11 | Example 12 | Example 13 | Example 14 | Example 15 |
|---|---|---|---|---|---|---|---|---|
| Formu-lation | Prepolymer | MDI amount (g) | | 269.2 | 281.0 | 281.0 | 241.4 | 201.0 |
| | | Trifunctional or higher polyfunctional isocyanate | Type | MR400 | TPTI | TPTI | MR200 | TTI |
| | | | Amount (g) | 120.0 | 120.0 | 120.0 | 150.0 | 180.0 |

TABLE 5-continued

| | | | | | | | | |
|---|---|---|---|---|---|---|---|---|
| | | Polyol | Type | PBA2500 | PBA2500 | PBA2500 | PBA2500 | PBA2500 |
| | | | Amount (g) | 610.8 | 599.0 | 599.0 | 608.6 | 619.0 |
| | Curing agent | Trifunctional or higher polyfunctional alcohol | Type | Glycerin | Penta-erythritol | TMP | TMP | TMP |
| | | | Amount (g) | 34.9 | 28.1 | 48.9 | 48.9 | 48.9 |
| | | 1,4-BD amount (g) | | 0.0 | 11.1 | 0.0 | 0.0 | 0.0 |
| | | Polyol | Type | PHA1000 | PHA1000 | PHA1000 | PHA1000 | PHA1000 |
| | | | Amount (g) | 256.0 | 287.6 | 276.8 | 276.8 | 276.8 |
| | | Polycat 46 amount (g) | | 0.13 | 0.13 | 0.13 | 0.13 | 0.13 |
| | | No. 25 amount (g) | | 0.55 | 0.55 | 0.55 | 0.55 | 0.55 |
| | Post-treatment | | | No | No | No | No | No |
| Elastic modulus | Tip surface | Mean value (MPa) | | 43 | 32 | 41 | 42 | 51 |
| | | Standard deviation (MPa) | | 1.290 | 1.440 | 1.140 | 1.190 | 1.510 |
| | | Coefficient of variation | | 3.0 | 4.5 | 2.8 | 2.8 | 3.0 |
| | Main surface | Mean value (MPa) | | 42 | 33 | 42 | 42 | 50 |
| | | Standard deviation (MPa) | | 1.270 | 1.460 | 1.150 | 1.180 | 1.490 |
| | | Coefficient of variation | | 3.0 | 4.4 | 2.7 | 2.8 | 3.0 |
| Concentration of trifunctional or higher polyfunctional alcohol (mmol/g) | | Tip surface | | 0.29 | 0.17 | 0.27 | 0.27 | 0.27 |
| | | Main surface | | 0.28 | 0.16 | 0.28 | 0.27 | 0.26 |
| M2/M1 | | Tip surface | | 0.0042 | 0.0041 | 0.0041 | 0.0052 | 0.0081 |
| | | Main surface | | 0.0042 | 0.0040 | 0.0041 | 0.0053 | 0.0083 |
| M3/M1 | | Tip surface | | 0.0729 | 0.0741 | 0.0741 | 0.0637 | 0.0530 |
| | | Main surface | | 0.0728 | 0.0742 | 0.0741 | 0.0636 | 0.0527 |
| Evaluation rank of wiping performance | | Pressing force 15 N/m | C direction | A | A | A | A | A |
| | | | W direction | A | B | A | A | A |
| | | Pressing force 7 N/m | C direction | A | B | A | A | B |
| | | | W direction | B | B | A | A | B |

| | | | | Example 16 | Example 17 | Example 18 | Example 19 | Example 20 |
|---|---|---|---|---|---|---|---|---|
| Formulation | Prepolymer | MDI amount (g) | | 201.0 | 201.0 | 352.6 | 198.2 | 198.2 |
| | | Trifunctional or higher polyfunctional isocyanate | Type | TTI | TTI | TTI | TTI | TTI |
| | | | Amount (g) | 180.0 | 180.0 | 10.0 | 180.0 | 180.0 |
| | | Polyol | Type | PBA2500 | PBA2500 | PBA2500 | PHA2600 | PHA2600 |
| | | | Amount (g) | 619.0 | 619.0 | 637.4 | 621.8 | 621.8 |
| | Curing agent | Trifunctional or higher polyfunctional alcohol | Type | TMP | TMP | Penta-erythritol | TMP | TMP |
| | | | Amount (g) | 56.0 | 59.6 | 26.6 | 59.6 | 59.6 |
| | | 1,4-BD amount (g) | | 0.0 | 0.0 | 7.0 | 0.0 | 0.0 |
| | | Polyol | Type | PHA1000 | PHA1000 | PBA1000 | PHA1000 | PBA1000 |
| | | | Amount (g) | 317.5 | 337.9 | 246.3 | 337.9 | 337.9 |
| | | Polycat 46 amount (g) | | 0.13 | 0.13 | 0.13 | 0.13 | 0.13 |
| | | No. 25 amount (g) | | 0.55 | 0.55 | 0.55 | 0.55 | 0.55 |
| | Post-treatment | | | No | No | No | No | No |
| Elastic modulus | Tip surface | Mean value (MPa) | | 47 | 44 | 17 | 46 | 43 |
| | | Standard deviation (MPa) | | 1.370 | 1.260 | 1.071 | 1.748 | 1.250 |
| | | Coefficient of variation | | 2.9 | 2.9 | 6.3 | 3.8 | 2.9 |
| | Main surface | Mean value (MPa) | | 46 | 44 | 18 | 48 | 43 |
| | | Standard deviation (MPa) | | 1.360 | 1.250 | 1.090 | 1.760 | 1.250 |
| | | Coefficient of variation | | 3.0 | 2.8 | 6.1 | 3.7 | 2.9 |
| Concentration of trifunctional or higher polyfunctional alcohol (mmol/g) | | Tip surface | | 0.30 | 0.32 | 0.15 | 0.32 | 0.31 |
| | | Main surface | | 0.30 | 0.31 | 0.14 | 0.33 | 0.32 |
| M2/M1 | | Tip surface | | 0.0082 | 0.0081 | 0.0011 | 0.0081 | 0.0082 |
| | | Main surface | | 0.0080 | 0.0081 | 0.0011 | 0.0082 | 0.0081 |
| M3/M1 | | Tip surface | | 0.0511 | 0.0503 | 0.0964 | 0.0496 | 0.0496 |
| | | Main surface | | 0.0513 | 0.0503 | 0.0964 | 0.0496 | 0.0497 |
| Evaluation rank of wiping performance | | Pressing force 15 N/m | C direction | A | A | B | A | A |
| | | | W direction | A | A | C | A | A |
| | | Pressing force 7 N/m | C direction | B | B | C | B | B |
| | | | W direction | B | B | C | B | B |

TABLE 6

| | | | | Example 21 | Example 22 | Example 23 | Example 24 | Example 25 |
|---|---|---|---|---|---|---|---|---|
| Formulation | Prepolymer | MDI amount (g) | | 217.2 | 191.1 | 209.1 | 187.6 | 164.0 |
| | | Trifunctional or higher polyfunctional isocyanate | Type | TTI | MR200 | TPTI | TPTI | TTI |
| | | | Amount (g) | 180.0 | 210.0 | 220.0 | 250.0 | 220.0 |
| | | Polyol | Type | PBA2500 | PBA2500 | PBA2500 | PBA2500 | PBA2500 |
| | | | Amount (g) | 602.8 | 598.9 | 570.9 | 562.4 | 616.0 |
| | Curing agent | Trifunctional or higher polyfunctional alcohol | Type | TMP | TMP | TMP | Glycerin | Glycerin |
| | | | Amount (g) | 63.1 | 53.9 | 59.6 | 45.8 | 37.5 |
| | | 1,4-BD amount (g) | | 0.0 | 0.0 | 0.0 | 0.0 | 0.0 |
| | | Polyol | Type | PHA1000 | PHA1000 | PHA1000 | PHA1000 | PHA1000 |
| | | | Amount (g) | 357.8 | 305.3 | 337.9 | 259.3 | 212.6 |
| | | Polycat 46 amount (g) | | 0.13 | 0.13 | 0.13 | 0.13 | 0.13 |
| | | No. 25 amount (g) | | 0.55 | 0.55 | 0.55 | 0.55 | 0.55 |
| | Post-treatment | | | No | No | No | No | No |
| Elastic modulus | Tip surface | Mean value (MPa) | | 47 | 49 | 51 | 55 | 58 |
| | | Standard deviation (MPa) | | 1.410 | 1.280 | 1.420 | 1.980 | 1.800 |
| | | Coefficient of variation | | 3.0 | 2.6 | 2.8 | 3.6 | 3.1 |
| | Main surface | Mean value (MPa) | | 49 | 47 | 53 | 54 | 59 |
| | | Standard deviation (MPa) | | 1.410 | 1.270 | 1.440 | 1.960 | 1.830 |
| | | Coefficient of variation | | 2.9 | 2.7 | 2.7 | 3.6 | 3.1 |
| Concentration of trifunctional or higher polyfunctional alcohol (mmol/g) | | Tip surface | | 0.33 | 0.30 | 0.32 | 0.37 | 0.32 |
| | | Main surface | | 0.32 | 0.30 | 0.32 | 0.38 | 0.33 |
| M2/M1 | | Tip surface | | 0.0079 | 0.0106 | 0.0112 | 0.0142 | 0.0123 |
| | | Main surface | | 0.0080 | 0.0105 | 0.0114 | 0.0141 | 0.0124 |
| M3/M1 | | Tip surface | | 0.0534 | 0.0491 | 0.0523 | 0.0502 | 0.0459 |
| | | Main surface | | 0.0533 | 0.0492 | 0.0523 | 0.0504 | 0.0457 |
| Evaluation rank of wiping performance | | Pressing force 15 N/m | C direction | A | A | A | A | B |
| | | | W direction | A | A | A | B | B |
| | | Pressing force 7 N/m | C direction | B | A | A | B | B |
| | | | W direction | B | A | A | B | B |

| | | | | Example 26 | Example 27 | Example 28 | Example 29 | Example 30 |
|---|---|---|---|---|---|---|---|---|
| Formulation | Prepolymer | MDI amount (g) | | 187.5 | 191.1 | 216.3 | 304.0 | 148.2 |
| | | Trifunctional or higher polyfunctional isocyanate | Type | MR400 | MR200 | TPTI | M200 | M200 |
| | | | Amount (g) | 220.0 | 210.0 | 210.0 | 20.0 | 210.0 |
| | | Polyol | Type | PBA2500 | PBA2500 | PBA2500 | PTG 2000SN | PTG 2000SN |
| | | | Amount (g) | 592.5 | 598.9 | 573.7 | 676.0 | 641.8 |
| | Curing agent | Trifunctional or higher polyfunctional alcohol | Type | Glycerin | TMP | TMP | Penta-erythritol | TMP |
| | | | Amount (g) | 43.0 | 53.9 | 53.9 | 39.6 | 37.8 |
| | | 1,4-BD amount (g) | | 0.0 | 0.0 | 0.0 | 0.0 | 0.0 |
| | | Polyol | Type | PHA1000 | PHA1000 | PHA1000 | PTG 1000SN | PTG 1000SN |
| | | | Amount (g) | 243.7 | 305.3 | 305.3 | 290.3 | 214.4 |
| | | Polycat 46 amount (g) | | 0.13 | 0.15 | 0.17 | 0.13 | 0.13 |
| | | No. 25 amount (g) | | 0.55 | 0.55 | 0.55 | 0.55 | 0.55 |
| | Post-treatment | | | No | No | No | No | No |
| Elastic modulus | Tip surface | Mean value (MPa) | | 61 | 50 | 52 | 16 | 39 |
| | | Standard deviation (MPa) | | 2.020 | 1.230 | 1.110 | 0.711 | 1.140 |
| | | Coefficient of variation | | 3.3 | 2.5 | 2.1 | 4.4 | 2.9 |
| | Main surface | Mean value (MPa) | | 62 | 51 | 52 | 16 | 41 |
| | | Standard deviation (MPa) | | 2.050 | 1.240 | 1.100 | 0.700 | 1.160 |
| | | Coefficient of variation | | 3.3 | 2.4 | 2.1 | 4.4 | 2.8 |
| Concentration of trifunctional or higher polyfunctional alcohol (mmol/g) | | Tip surface | | 0.37 | 0.30 | 0.30 | 0.21 | 0.23 |
| | | Main surface | | 0.36 | 0.30 | 0.31 | 0.22 | 0.24 |
| M2/M1 | | Tip surface | | 0.0122 | 0.0087 | 0.0088 | 0.0049 | 0.0147 |
| | | Main surface | | 0.0124 | 0.0089 | 0.0088 | 0.0048 | 0.0147 |
| M3/M1 | | Tip surface | | 0.0509 | 0.0491 | 0.0556 | 0.0805 | 0.0413 |
| | | Main surface | | 0.0507 | 0.0490 | 0.0556 | 0.0805 | 0.0413 |
| Evaluation rank of wiping performance | | Pressing force 15 N/m | C direction | A | A | A | B | A |
| | | | W direction | B | A | A | C | A |
| | | Pressing force 7 N/m | C direction | B | A | A | B | A |
| | | | W direction | B | A | A | C | A |

TABLE 7

| | | | | Example 31 | Example 32 | Example 33 | Example 34 | Example 35 |
|---|---|---|---|---|---|---|---|---|
| Formulation | Prepolymer | MDI amount (g) | | 148.2 | 148.2 | 349.5 | 345.5 | 281.0 |
| | | Trifunctional or higher polyfunctional isocyanate | Type | M200 | M200 | — | MR400 | TPTI |
| | | | Amount (g) | 210.0 | 210.0 | — | 20.0 | 120.0 |
| | | Polyol | Type | PTG 2000SN | PTG 2000SN | PBA2000 | PBA2500 | PBA2500 |
| | | | Amount (g) | 641.8 | 641.8 | 650.5 | 634.5 | 599.0 |
| | Curing agent | Trifunctional or higher polyfunctional alcohol | Type | TMP | TMP | Glycerin | Penta-erythritol | Penta-erythritol |
| | | | Amount (g) | 46.2 | 41.7 | 5.0 | 46.7 | 28.8 |
| | | 1,4-BD amount (g) | | 0.0 | 0.0 | 40.4 | 7.8 | 14.4 |
| | | Polyol | Type | PTG 1000SN | PTG 1000SN | PHA1000 | PHA1000 | PHA1000 |
| | | | Amount (g) | 261.7 | 236.5 | 5.0 | 334.3 | 316.3 |
| | | Polycat 46 amount (g) | | 0.13 | 0.13 | 0.05 | 0.13 | 0.13 |
| | | No. 25 amount (g) | | 0.55 | 0.55 | 0.25 | 0.55 | 0.55 |
| | Post-treatment | | | No | No | No | UV 492 $mJ/cm^2$ | UV 1968 $mJ/cm^2$ |
| Elastic modulus | Tip surface | Mean value (MPa) | | 42 | 47 | 28 | 68 | 241 |
| | | Standard deviation (MPa) | | 1.260 | 1.280 | 2.700 | 3.200 | 9.400 |
| | | Coefficient of variation | | 3.0 | 2.7 | 9.6 | 4.7 | 3.9 |
| | Main surface | Mean value (MPa) | | 45 | 49 | 28 | 67 | 244 |
| | | Standard deviation (MPa) | | 1.300 | 1.290 | 2.690 | 3.100 | 9.500 |
| | | Coefficient of variation | | 2.9 | 2.6 | 9.6 | 4.6 | 3.9 |
| Concentration of trifunctional or higher polyfunctional alcohol (mmol/g) | | Tip surface | | 0.26 | 0.24 | 0.05 | 0.25 | 0.17 |
| | | Main surface | | 0.26 | 0.25 | 0.05 | 0.24 | 0.16 |
| M2/M1 | | Tip surface | | 0.0132 | 0.0131 | — | 0.0012 | 0.0041 |
| | | Main surface | | 0.0133 | 0.0132 | — | 0.0011 | 0.0041 |
| M3/M1 | | Tip surface | | 0.0396 | 0.0405 | 0.1165 | 0.0870 | 0.0723 |
| | | Main surface | | 0.0395 | 0.0404 | 0.1165 | 0.0871 | 0.0723 |
| Evaluation rank of wiping performance | | Pressing force 15 N/m | C direction | A | A | C | B | B |
| | | | W direction | A | A | C | B | B |
| | | Pressing force 7 N/m | C direction | A | A | C | C | C |
| | | | W direction | A | A | C | C | C |

| | | | | Example 36 | Example 37 | Example 38 | Example 39 | Example 40 |
|---|---|---|---|---|---|---|---|---|
| Formulation | Prepolymer | MDI amount (g) | | 164.0 | 296.6 | 334.1 | 281.0 | 164.0 |
| | | Trifunctional or higher polyfunctional isocyanate | Type | TTI | — | TTI | TPTI | TTI |
| | | | Amount (g) | 220.0 | — | 30.0 | 120.0 | 220.0 |
| | | Polyol | Type | PBA2500 | PBA2000 | PBA2500 | PBA2500 | PBA2500 |
| | | | Amount (g) | 616.0 | 703.4 | 635.9 | 599.0 | 616.0 |
| | Curing agent | Trifunctional or higher polyfunctional alcohol | Type | Penta-erythritol | Glycerin | Penta-erythritol | Penta-erythritol | Glycerin |
| | | | Amount (g) | 50.6 | 19.2 | 47.7 | 46.0 | 33.1 |
| | | 1,4-BD amount (g) | | 0.0 | 52.0 | 7.9 | 4.2 | 0.0 |
| | | Polyol | Type | PHA1000 | — | PHA1000 | PHA1000 | PHA1000 |
| | | | Amount (g) | 202.5 | 0.0 | 341.7 | 367.6 | 187.6 |
| | | Polycat 46 amount (g) | | 0.13 | 0.05 | 0.13 | 0.13 | 0.13 |
| | | No. 25 amount (g) | | 0.55 | 0.25 | 0.55 | 0.55 | 0.55 |
| | Post-treatment | | | UV 3936 $mJ/cm^2$ | UV 1968 $mJ/cm^2$ | — | UV 1968 $mJ/cm^2$ | UV 3936 $mJ/cm^2$ |
| Elastic modulus | Tip surface | Mean value (MPa) | | 470 | 212 | 15 | 253 | 470 |
| | | Standard deviation (MPa) | | 22.200 | 13.200 | 0.500 | 5.060 | 9.400 |
| | | Coefficient of variation | | 4.7 | 6.2 | 3.3 | 2.0 | 2.0 |
| | Main surface | Mean value (MPa) | | 468 | 214 | 16 | 255 | 469 |
| | | Standard deviation (MPa) | | 22.000 | 13.200 | 0.520 | 5.200 | 9.300 |
| | | Coefficient of variation | | 4.7 | 6.2 | 3.3 | 2.0 | 2.0 |
| Concentration of trifunctional or higher polyfunctional alcohol (mmol/g) | | Tip surface | | 0.31 | 0.18 | 0.25 | 0.22 | 0.28 |
| | | Main surface | | 0.30 | 0.19 | 0.24 | 0.23 | 0.27 |
| M2/M1 | | Tip surface | | 0.0121 | — | 0.0016 | 0.0040 | 0.0122 |
| | | Main surface | | 0.0122 | — | 0.0017 | 0.0041 | 0.0124 |
| M3/M1 | | Tip surface | | 0.0457 | 0.0969 | 0.0836 | 0.0693 | 0.0470 |
| | | Main surface | | 0.0456 | 0.0969 | 0.0836 | 0.0692 | 0.0470 |
| Evaluation rank of wiping performance | | Pressing force 15 N/m | C direction | B | C | B | B | B |
| | | | W direction | B | C | B | B | B |
| | | Pressing force 7 N/m | C direction | C | C | C | C | C |
| | | | W direction | C | C | C | C | C |

TABLE 8

| | | | | Example 41 | Example 42 | Example 43 | Example 44 | Example 45 |
|---|---|---|---|---|---|---|---|---|
| Formulation | Prepolymer | MDI amount (g) | | 372.8 | 327.0 | 526.0 | 602.6 | 602.6 |
| | | Trifunctional or higher polyfunctional isocyanate | Type | — | — | — | — | — |
| | | | Amount (g) | — | — | — | — | — |
| | | Polyol | Type | PBA1000 PBA2000 | PBA2000 | PBA1000 PBA2000 | PBA1000 PBA2000 | PBA1000 PBA2000 |
| | | | Amount (g) | 627.2 | 673.0 | 474.0 | 397.4 | 397.4 |
| | Curing agent | Trifunctional or higher polyfunctional alcohol | Type | Penta-erythritol | TMP | — | — | — |
| | | | Amount (g) | 5.1 | 16.7 | — | — | — |
| | | 1,4-BD amount (g) | | 41.0 | 16.7 | 91.3 | 88.4 | 88.4 |
| | | Polyol | Type | PHA1000 | PHA1000 | PHA1000 | PHA1000 | PHA1000 |
| | | | Amount (g) | 5.1 | 204.9 | 91.3 | 88.4 | 88.4 |
| | | Polycat 46 amount (g) | | 0.05 | 0.05 | 0.15 | 0.15 | 0.15 |
| | | No. 25 amount (g) | | 0.25 | 0.25 | 0.55 | 0.55 | 0.55 |
| | Post-treatment | | | No | No | No | No | UV 492 $mJ/cm^2$ |
| Elastic modulus | Tip surface | Mean value (MPa) | | 25 | 16 | 15 | 30 | 84 |
| | | Standard deviation (MPa) | | 2.800 | 1.500 | 2.640 | 5.040 | 10.300 |
| | | Coefficient of variation | | 11.2 | 9.4 | 17.6 | 16.8 | 12.3 |
| | Main surface | Mean value (MPa) | | 23 | 18 | 15 | 32 | 86 |
| | | Standard deviation (MPa) | | 2.700 | 1.700 | 2.500 | 5.100 | 10.300 |
| | | Coefficient of variation | | 11.7 | 9.4 | 16.7 | 15.9 | 12.0 |
| Concentration of trifunctional or higher polyfunctional alcohol (mmol/g) | | Tip surface | | 0.04 | 0.10 | — | — | — |
| | | Main surface | | 0.04 | 0.11 | — | — | — |
| M2/M1 | | Tip surface | | — | — | — | — | — |
| | | Main surface | | — | — | — | — | — |
| M3/M1 | | Tip surface | | 0.1241 | 0.0924 | 0.1556 | 0.1792 | 0.1794 |
| | | Main surface | | 0.1241 | 0.0924 | 0.1557 | 0.1792 | 0.1793 |
| Evaluation rank of wiping performance | | Pressing force 15 N/m | C direction | C | C | C | C | C |
| | | | W direction | C | C | C | C | C |
| | | Pressing force 7 N/m | C direction | C | C | D | D | C |
| | | | W direction | C | C | D | D | D |

| | | | | Example 46 | Example 47 | Example 48 | Example 49 | Example 50 |
|---|---|---|---|---|---|---|---|---|
| Formulation | Prepolymer | MDI amount (g) | | 602.6 | 348.9 | 330.9 | 236.6 | 154.7 |
| | | Trifunctional or higher polyfunctional isocyanate | Type | — | TTI | TPTI | MR400 | MR400 |
| | | | Amount (g) | — | 30 | 50 | 150 | 250 |
| | | Polyol | Type | PBA1000 PBA2000 | PBA2000 | PBA2000 | PBA2000 | PBA2000 |
| | | | Amount (g) | 397.4 | 621.1 | 619.1 | 613.4 | 595.3 |
| | Curing agent | Trifunctional or higher polyfunctional alcohol | Type | — | — | — | — | — |
| | | | Amount (g) | — | — | — | — | — |
| | | 1,4-BD amount (g) | | 88.4 | 18.3 | 14.4 | 15.7 | 14.4 |
| | | Polyol | Type | PHA1000 | PHA1000 | PHA1000 | PHA1000 | PHA1000 |
| | | | Amount (g) | 88.4 | 73.3 | 57.6 | 62.8 | 57.6 |
| | | Polycat 46 amount (g) | | 0.15 | 0.13 | 0.13 | 0.13 | 0.13 |
| | | No. 25 amount (g) | | 0.55 | 0.55 | 0.55 | 0.55 | 0.55 |
| | Post-treatment | | | UV 2952 $mJ/cm^2$ | No | No | No | No |
| Elastic modulus | Tip surface | Mean value (MPa) | | 338 | 21 | 33 | 42 | 53 |
| | | Standard deviation (MPa) | | 43.400 | 1.932 | 2.772 | 2.982 | 3.392 |
| | | Coefficient of variation | | 12.8 | 9.2 | 8.4 | 7.1 | 6.4 |
| | Main surface | Mean value (MPa) | | 341 | 23 | 35 | 41 | 55 |
| | | Standard deviation (MPa) | | 43.400 | 1.930 | 2.900 | 2.982 | 3.500 |
| | | Coefficient of variation | | 12.7 | 8.4 | 8.3 | 7.3 | 6.4 |
| Concentration of trifunctional or higher polyfunctional alcohol (mmol/g) | | Tip surface | | — | — | — | — | — |
| | | Main surface | | — | — | — | — | — |
| M2/M1 | | Tip surface | | — | 0.0016 | 0.0024 | 0.0060 | 0.0095 |
| | | Main surface | | — | 0.0015 | 0.0023 | 0.0059 | 0.0094 |
| M3/M1 | | Tip surface | | 0.1792 | 0.1118 | 0.1078 | 0.0767 | 0.0504 |
| | | Main surface | | 0.1791 | 0.1119 | 0.1080 | 0.0768 | 0.0505 |
| Evaluation rank of wiping performance | | Pressing force 15 N/m | C direction | C | B | B | B | B |
| | | | W direction | C | C | C | C | C |
| | | Pressing force 7 N/m | C direction | C | C | B | B | B |
| | | | W direction | D | C | C | C | C |

TABLE 9

| | | | | Example 51 | Example 52 | Example 53 | Example 54 |
|---|---|---|---|---|---|---|---|
| Formu-lation | Prepolymer | MDI amount (g) | | 296.6 | 296.6 | 343.3 | 343.3 |
| | | Trifunctional or higher polyfunctional isocyanate | Type | — | — | TTI | TTI |
| | | | Amount (g) | — | — | 20.0 | 20.0 |
| | | Polyol | Type | PBA2000 | PBA2000 | PBA2500 | PBA2500 |
| | | | Amount (g) | 703.4 | 703.4 | 636.7 | 636.7 |
| | Curing agent | Trifunctional or higher polyfunctional alcohol | Type | Glycerin | Glycerin | Penta-erythritol | Penta-erythritol |
| | | | Amount (g) | 19.2 | 19.2 | 46.7 | 46.7 |
| | | 1,4-BD amount (g) | | 52.0 | 52.0 | 7.8 | 7.8 |
| | | Polyol | Type | — | — | PHA1000 | PHA1000 |
| | | | Amount (g) | 0.0 | 0.0 | 334.3 | 334.3 |
| | | Polycat 46 amount (g) | | 0.05 | 0.05 | 0.13 | 0.13 |
| | | No. 25 amount (g) | | 0.25 | 0.25 | 0.55 | 0.55 |
| | Post-treatment | | | 4,4'-MDI immersion 80° C. 1 min | 4,4'-MDI immersion 80° C. 1 min → 100° C. 30 min | 4,4'-MDI immersion 80° C. 3 min | 4,4'-MDI immersion 80° C. 3 min → 100° C. 30 min |
| Elastic modulus | Tip surface | Mean value (MPa) | | 438 | 45 | 470 | 53 |
| | | Standard deviation (MPa) | | 29.600 | 4.200 | 20.500 | 3.100 |
| | | Coefficient of variation | | 6.8 | 9.3 | 4.4 | 5.8 |
| | Main surface | Mean value (MPa) | | 438 | 47 | 470 | 54 |
| | | Standard deviation (MPa) | | 29.600 | 4.300 | 21.000 | 3.200 |
| | | Coefficient of variation | | 6.8 | 9.1 | 4.5 | 5.9 |
| Concentration of trifunctional or higher polyfunctional alcohol (mmol/g) | | Tip surface | | 0.13 | 0.15 | 0.21 | 0.24 |
| | | Main surface | | 0.14 | 0.15 | 0.20 | 0.23 |
| M2/M1 | | Tip surface | | — | — | 0.0005 | 0.0010 |
| | | Main surface | | — | — | 0.0006 | 0.0011 |
| M3/M1 | | Tip surface | | 0.3822 | 0.1923 | 0.4320 | 0.2830 |
| | | Main surface | | 0.3793 | 0.1855 | 0.4380 | 0.2850 |
| Evaluation rank of wiping performance | | Pressing force 15 N/m | C direction | C | B | B | B |
| | | | W direction | C | C | B | B |
| | | Pressing force 7 N/m | C direction | C | C | C | B |
| | | | W direction | C | C | C | C |

TABLE 10

| | | | | Comparative example 1 | Comparative example 2 | Comparative example 3 | Comparative example 4 |
|---|---|---|---|---|---|---|---|
| Formu-lation | Prepolymer | MDI amount (g) | | 500.4 | 372.8 | 296.6 | — |
| | | Trifunctional or higher polyfunctional isocyanate | Type | — | — | — | — |
| | | | Amount (g) | — | — | 0 | — |
| | | Polyol | Type | PBA1000 PBA2000 | PBA1000 PBA2000 | PBA2000 | — |
| | | | Amount (g) | 499.6 | 627.2 | 703.4 | — |
| | Curing agent | Trifunctional or higher polyfunctional alcohol | Type | — | Penta-erythritol | — | — |
| | | | Amount (g) | — | 11.7 | 19.2 | — |
| | | 1,4-BD amount (g) | | 132.2 | 66.3 | 52.0 | — |
| | | Polyol | Type | PHA1000 | PHA1000 | PHA1000 | — |
| | | | Amount (g) | 132.2 | 0.0 | 0.0 | — |
| | | Polycat 46 amount (g) | | 0 | 0 | 0 | — |
| | | No. 25 amount (g) | | 0.25 | 0.25 | 0.25 | — |
| | Post-treatment | | | No | No | UV 8200 $mJ/cm^2$ | — |
| Elastic modulus | Tip surface | Mean value (MPa) | | 8 | 25 | 850.78 | 72.28 |
| | | Standard deviation (MPa) | | 2.300 | 6.100 | 45.600 | 86.240 |
| | | Coefficient of variation | | 28.8 | 24.4 | 5.4 | 119.3 |
| | Main surface | Mean value (MPa) | | 8 | 23 | 850.67 | 72.28 |
| | | Standard deviation (MPa) | | 2.300 | 5.400 | 46.100 | 86.240 |
| | | Coefficient of variation | | 28.8 | 23.5 | 5.4 | 119.3 |
| Concentration of trifunctional or higher polyfunctional alcohol (mmol/g) | | Tip surface | | — | 0.08 | 0.19 | — |
| | | Main surface | | — | 0.07 | 0.17 | — |
| M2/M1 | | Tip surface | | — | — | — | — |
| | | Main surface | | — | — | — | — |
| M3/M1 | | Tip surface | | 0.1386 | 0.1210 | 0.0969 | — |
| | | Main surface | | 0.1383 | 0.1208 | 0.0971 | — |

TABLE 10-continued

| | | | Comparative example 1 | Comparative example 2 | Comparative example 3 | Comparative example 4 |
|---|---|---|---|---|---|---|
| Evaluation rank of wiping performance | Pressing force 15 N/m | C direction | E | D | E | E |
| | | W direction | E | E | E | E |
| | Pressing force 7 N/m | C direction | E | E | E | E |
| | | W direction | E | E | E | E |

The present disclosure is not limited to the embodiments above, and can accommodate various modifications and alterations without departing from the spirit and scope of the disclosure. Accordingly, the claims below are appended herein to for the purpose of making public the scope of the present disclosure.

What is claimed is:

1. A wiper blade, comprising:

a hand grip portion; and an elastic portion supported by the hand grip portion, a part of the elastic portion being configured to be pressed against a surface of a member to be cleaned in order to clean the surface of the member, the hand grip portion extending in a direction perpendicular to a direction in which the elastic portion extends; and the elastic portion comprising a polyurethane which is a reaction product of a composition comprising an isocyanate compound including a diisocyanate and a trifunctional or higher polyfunctional isocyanate, and an alcohol including a trifunctional or higher polyfunctional alcohol, wherein when defining a side of the elastic portion farthest away from the hand grip portion as a tip side of the wiper blade, the elastic portion has, on the tip side, a main surface opposing the member to be cleaned, and a tip surface that forms a tip side edge together with the main surface, when defining a length of a first line segment drawn on the tip surface parallelly to the tip side edge at a distance of 10 μm from the tip side edge as L1, and respectively defining points at (⅛)L1, (½)L1 and (⅞)L1 from one end side on the first line segment as P0, P1 and P2, and when measuring, using a scanning probe microscope, an elastic modulus at 70000 points at a 0.1 μm pitch in each of three rectangular observation regions on the tip surface, each of the rectangular observation regions having respective centroids at P0, P1 and P2, and having a 70 μm-long side parallel to the first line segment and a 10 μm-long side perpendicularly intersecting the first line segment, a mean value of the 210000 obtained elastic modulus values is 15 to 470 MPa, and a coefficient of variation of elastic modulus is 17.6% or lower, when defining a length of a second line segment drawn on the main surface parallelly to the tip side edge at a distance of 10 μm from the tip side edge as L2 and respectively defining points at (⅛)L2, (½)L2 and (⅞) L2 from one end side on the second line segment as P3, P4 and P5, and when measuring, using a scanning probe microscope at 70000 points at a 0.1 μm pitch in each of three rectangular observation regions on the main surface, each of the rectangular observation regions having centroids at P3, P4 and P5, and having a 70 μm-long side parallel to the second line segment and a 10 μm-long side perpendicularly intersecting the second line segment, a mean value of the 210000 obtained elastic modulus values is 15 to 470 MPa, and a coefficient of variation of elastic modulus is 17.6% or lower, in a measurement of elastic modulus on the tip surface, the coefficient of variation of elastic modulus is 6.0% or lower, and in a measurement of elastic modulus on the main surface, the coefficient of variation of elastic modulus is 6.0% or lower.

2. The wiper blade according to claim 1, wherein having respective line segments drawn on the tip surface and on the main surface of the elastic portion parallelly to the tip side edge at a distance of 0.5 mm from the tip side edge and defining a length of each of the line segments as L', and respectively defining points at ⅛L', ½L', ⅞L' from one end side on each of the line segments as P0', P1' and P2', when samples sampled at P0', P1' and P2' on the tip surface and the main surface are heated up to 1000° C. at a temperature rise rate of 10° C./s using a mass spectrometer of a direct sample introduction type in which each of the samples are heated and vaporized in an ionization chamber and molecules of each of the samples are ionized, at the tip surface M2/M1 is 0.0010 to 0.0150, and M3/M1 is 0.0200 to 0.1100, and at the main surface M2/M1 is 0.0010 to 0.0150, and M3/M1 is 0.0200 to 0.1100 where M1 is a detected amount of all ions,

M2 is an integrated intensity of a peak in an extracted ion thermogram corresponding to a range of an m/z value derived from the trifunctional or higher polyfunctional isocyanate, and M3 is an integrated intensity of a peak in an extracted ion thermogram corresponding to a range of an m/z value derived from the diisocyanate.

3. The wiper blade according to claim 1, wherein having respective line segments drawn on the tip surface and on the main surface of the elastic portion parallelly to the tip side edge at a distance of 0.5 mm from the tip side edge and defining a length of each of the line segments is defined as L', and respectively defining points at ⅛L', ½L', ⅞L' from one end side on each of the line segments as P0', P1' and P2, when samples sampled at P0', P1' and P2' on the tip surface and the main surface are subjected to measurement, by pyrolysis GC/MS, a concentration of the trifunctional or higher polyfunctional alcohol in the polyurethane is 0.04 to 0.39 mmol/g on the tip surface, and a concentration of the trifunctional or higher polyfunctional alcohol in the polyurethane is 0.04 to 0.39 mmol/g on the main surface.

4. The wiper blade according to claim 1, wherein the trifunctional or higher polyfunctional alcohol comprises at least one member selected from the group consisting of trimethylolpropane and glycerin.

5. The wiper blade according to claim 1, wherein the trifunctional or higher polyfunctional isocyanate is at least one member selected from the group consisting of triphenylmethane-4,4',4"-triisocyanate (TTI), tris(phenylisocyanate)thiophosphate (TPTI) and polymeric MDI.

6. The wiper blade according to claim 1, wherein in a measurement of the elastic modulus on the tip surface, the mean value of elastic modulus values is 32 to 62 MPa, and in a measurement of the elastic modulus on the main surface, the mean value of elastic modulus values is 32 to 62 MPa.

* * * * *